(12) United States Patent
Patil et al.

(10) Patent No.: US 10,506,492 B2
(45) Date of Patent: Dec. 10, 2019

(54) SYSTEM AND METHOD TO FACILITATE LINK AGGREGATION USING NETWORK-BASED INTERNET PROTOCOL (IP) FLOW MOBILITY IN A NETWORK ENVIRONMENT

(71) Applicant: CISCO TECHNOLOGY, INC., San Jose, CA (US)

(72) Inventors: Santosh Ramrao Patil, San Jose, CA (US); Mark Grayson, Berkshire (GB); Gangadharan Byju Pularikkal, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 174 days.

(21) Appl. No.: 15/623,247

(22) Filed: Jun. 14, 2017

(65) Prior Publication Data
US 2018/0368047 A1   Dec. 20, 2018

(51) Int. Cl.
| | |
|---|---|
| *H04L 12/709* | (2013.01) |
| *H04W 40/12* | (2009.01) |
| *H04L 12/721* | (2013.01) |
| *H04L 12/707* | (2013.01) |
| *H04W 84/12* | (2009.01) |
| *H04W 84/04* | (2009.01) |

(52) U.S. Cl.
CPC ............ *H04W 40/12* (2013.01); *H04L 45/24* (2013.01); *H04L 45/245* (2013.01); *H04L 45/38* (2013.01); *H04W 84/042* (2013.01); *H04W 84/12* (2013.01)

(58) Field of Classification Search
CPC ..... H04L 45/245; H04L 45/00; H04L 43/026; H04L 45/306; H04L 47/10; H04W 40/02; H04W 48/17; H04W 48/20; G06F 16/9014
See application file for complete search history.

(56) References Cited

U.S. PATENT DOCUMENTS

| | | |
|---|---|---|
| 8,144,591 B2 | 3/2012 | Ghai |
| 8,400,916 B2 | 3/2013 | Cutler |
| 8,717,880 B2 | 5/2014 | Agulnik et al. |
| 8,856,860 B2 | 10/2014 | Grayson |
| 9,264,942 B2 | 2/2016 | Sarkar et al. |
| 9,294,982 B2 | 3/2016 | Srivastava et al. |

(Continued)

OTHER PUBLICATIONS

PCT Written Opinion of the International Searching Authority for Application No. PCT/US2018/036092.

(Continued)

*Primary Examiner* — Mohamed A Kamara
(74) *Attorney, Agent, or Firm* — Patterson + Sheridan, LLP

(57) ABSTRACT

An example method is provided in one example embodiment and may include receiving, at a packet data network gateway (PGW), a packet associated with an Internet Protocol (IP) flow of a user equipment (UE); identifying a routing rule associated with the IP flow, wherein the routing rule comprises routing access information that identifies whether the IP flow can be routed across a plurality of access networks using weighted link aggregation; and selecting a particular access network to facilitate communications for the IP flow of the UE based on the routing rule. In some cases, the selecting can include assigning the IP flow of the UE to a bearer established for the UE for the particular access network.

20 Claims, 8 Drawing Sheets

(56) References Cited

U.S. PATENT DOCUMENTS

| | | |
|---|---|---|
| 9,295,070 B2 | 3/2016 | Damola |
| 9,635,686 B2 | 4/2017 | Jain et al. |
| 9,674,764 B2 | 6/2017 | Jain et al. |
| 2009/0190580 A1* | 7/2009 | Kailasam ................ H04L 45/00 370/389 |
| 2012/0093004 A1* | 4/2012 | Nishi .................. H04L 41/0631 370/242 |
| 2016/0285746 A1 | 9/2016 | Parron et al. |
| 2017/0230871 A1* | 8/2017 | Rangaswamy ..... H04L 61/2007 |
| 2018/0227229 A1* | 8/2018 | Lopez ..................... H04L 45/74 |

OTHER PUBLICATIONS

Krishnan et al., "Mechanisms for Optimizing Link Aggregation Group (LAG) and Equal-Cost Multipath (ECMP) Component Link Utilization in Networks," IETF, ISSN: 2070-1721, Jan. 2015, 29 pages.

* cited by examiner

100

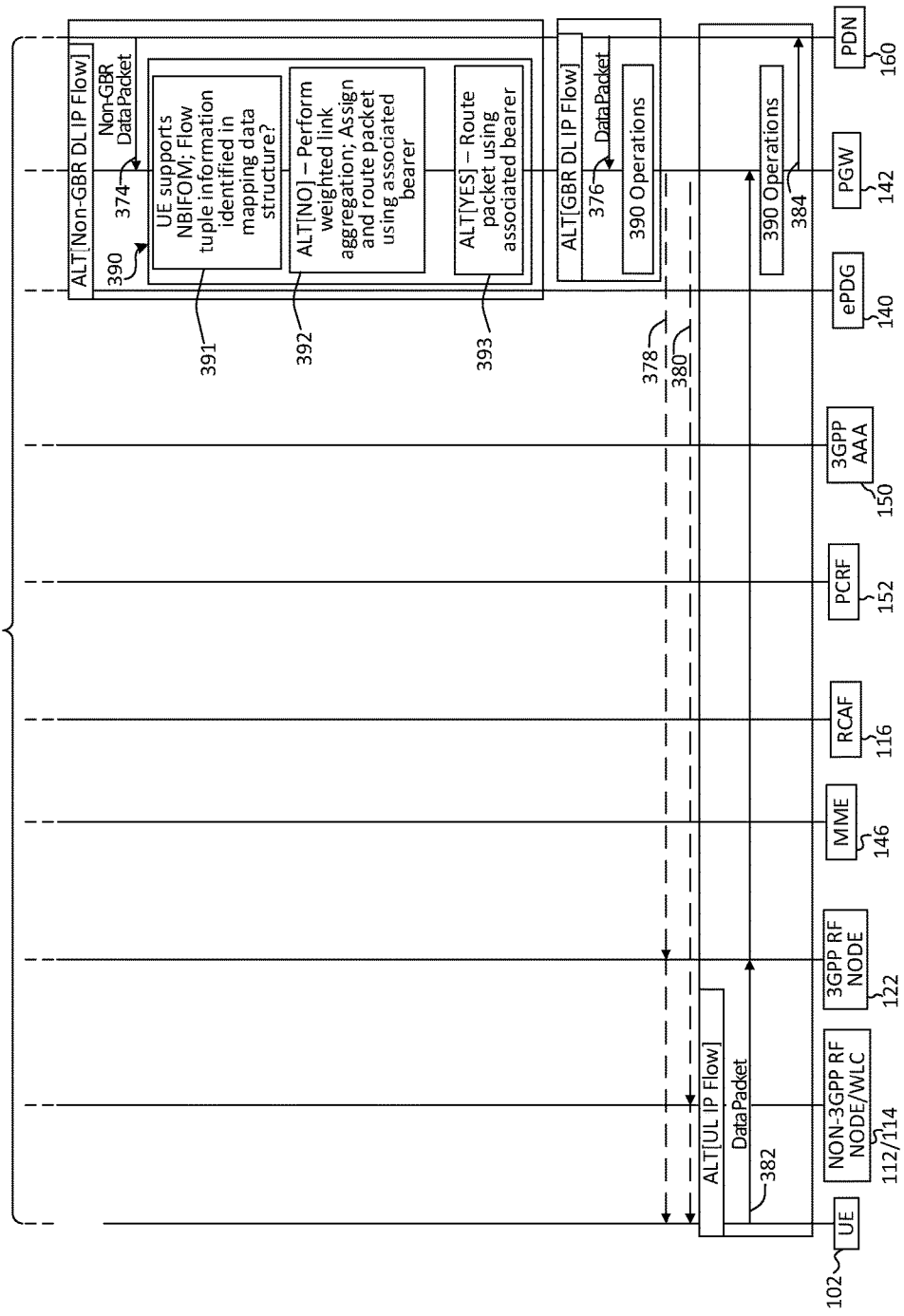

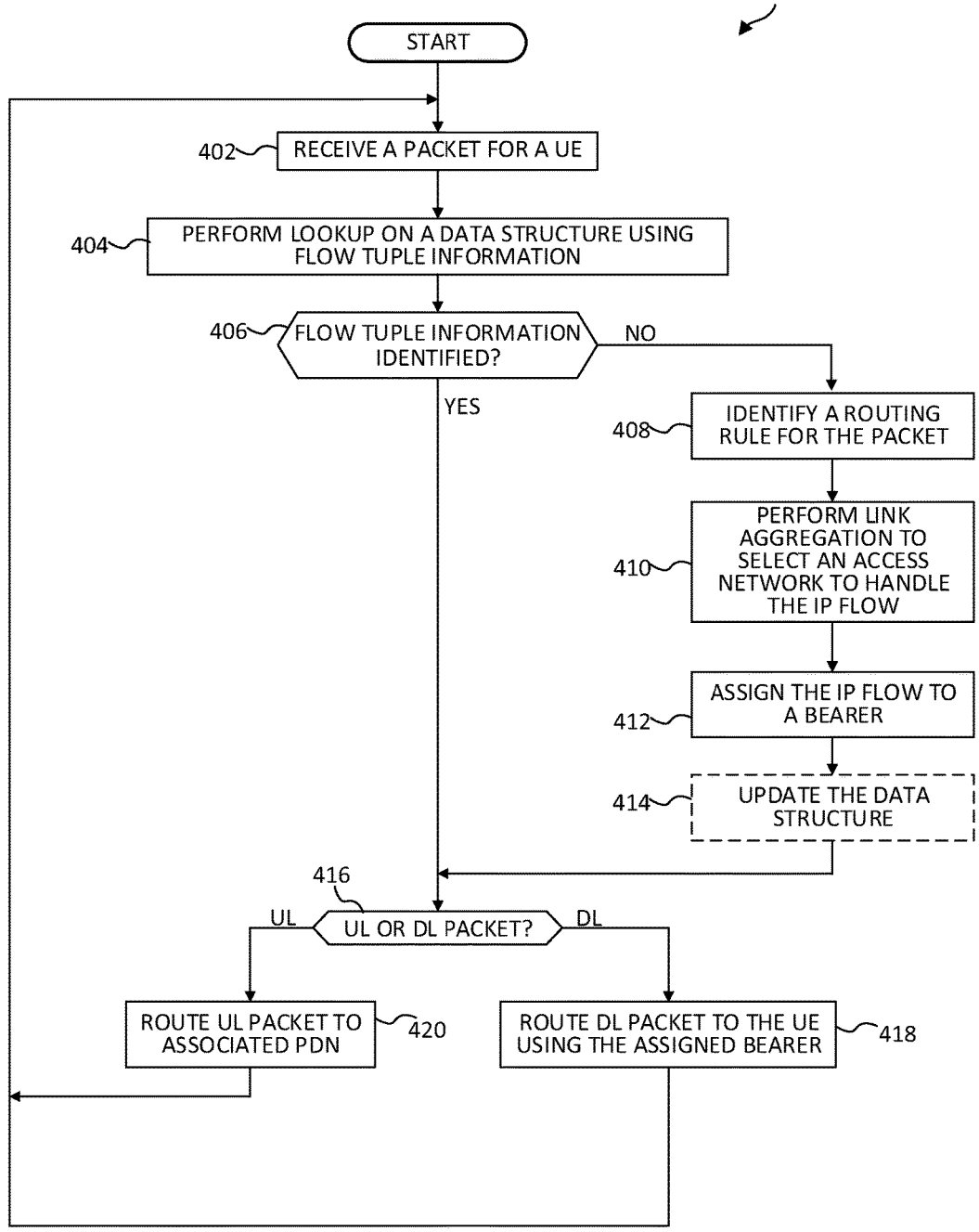

SYSTEM AND METHOD TO FACILITATE LINK AGGREGATION USING NETWORK-BASED INTERNET PROTOCOL (IP) FLOW MOBILITY IN A NETWORK ENVIRONMENT

TECHNICAL FIELD

This disclosure relates in general to the field of communications and, more particularly, to a system and method to facilitate link aggregation using Network-based Internet Protocol (IP) Flow Mobility (NBIFOM) in a network environment.

BACKGROUND

Networking architectures have grown increasingly complex in communications environments, particularly mobile wireless environments. For example, network providers have developed architectures in which a communication network can include both 3rd Generation Partnership Project (3GPP) access networks, such as Long Term Evolution (LTE) networks, and Wireless Local Area Network (WLAN) access networks, such as Wi-Fi, and each access network can be accessed by user equipment (UE) having multi-mode communication capabilities. 3GPP Release 13 (Rel-13) Technical Specifications define several integrated LTE-WLAN interworking architectures including LTE-WLAN Aggregation (LWA), LTE WLAN Radio Level Integration with Internet Protocol Security (IPSec) Tunnel (LWIP), and Radio Access Network (RAN) Controlled LTE-WLAN Interworking (RCLWI). In some cases network operators and/or service providers may desire to provide link aggregation across LTE and WLAN communication links, which presents significant challenges to network operators and/or service providers.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 3A-3D are a simplified interaction diagram illustrating example details that can be associated with providing link aggregation using NBIFOM in accordance with various potential embodiments;

FIG. 4 is a simplified flow diagram illustrating example operations that can be associated with providing link aggregation using NBIFOM in accordance with one potential embodiment.

DETAILED DESCRIPTION OF EXAMPLE EMBODIMENTS

Overview

A method is provided in one example embodiment and may include receiving, at a packet data network gateway (PGW), a packet associated with an Internet Protocol (IP) flow of a user equipment (UE); identifying a routing rule associated with the IP flow, wherein the routing rule comprises routing access information that identifies whether the IP flow can be routed across a plurality of access networks using weighted link aggregation; and selecting a particular access network to facilitate communications for the IP flow of the UE based on the routing rule. In some cases, the selecting can include assigning the IP flow of the UE to a bearer established for the UE for the particular access network.

In some cases, the selecting can include performing a comparison between a hash of a flow tuple for the packet against a threshold value associated with the routing rule; and identifying the particular access network to facilitate communications for the IP flow of the UE based on the comparison. In at least one instance, the threshold value can be a static weight value that received by the PGW from the UE.

In still some cases, the selecting can include determining a first metric associated with communication quality of a first access network to facilitate communications for the IP flow of the UE; determining a second metric associated with communication quality of a second access network to facilitate communications for the IP flow of the UE; performing a comparison between the first metric and a threshold value; performing a comparison between the second metric and the threshold value; and identifying the particular access network to facilitate communications for the IP flow of the UE based on the comparison of the first metric and the second metric to the threshold value. In some instances, the method can include storing, by the PGW, flow tuple information included with the packet in association with a selected access network in a data structure maintained by the PGW.

In still some cases, the method can include receiving, by the PGW, an indication from the UE that the UE supports receiving packets using the plurality of access networks using weighted link aggregation; and storing the indication received from the UE. In various instances, the plurality of access networks can include any combination of one or more 3rd Generation Partnership Project (3GPP) access network types and/or one or more non-3GPP access network types.

Example Embodiments

Figure 1:
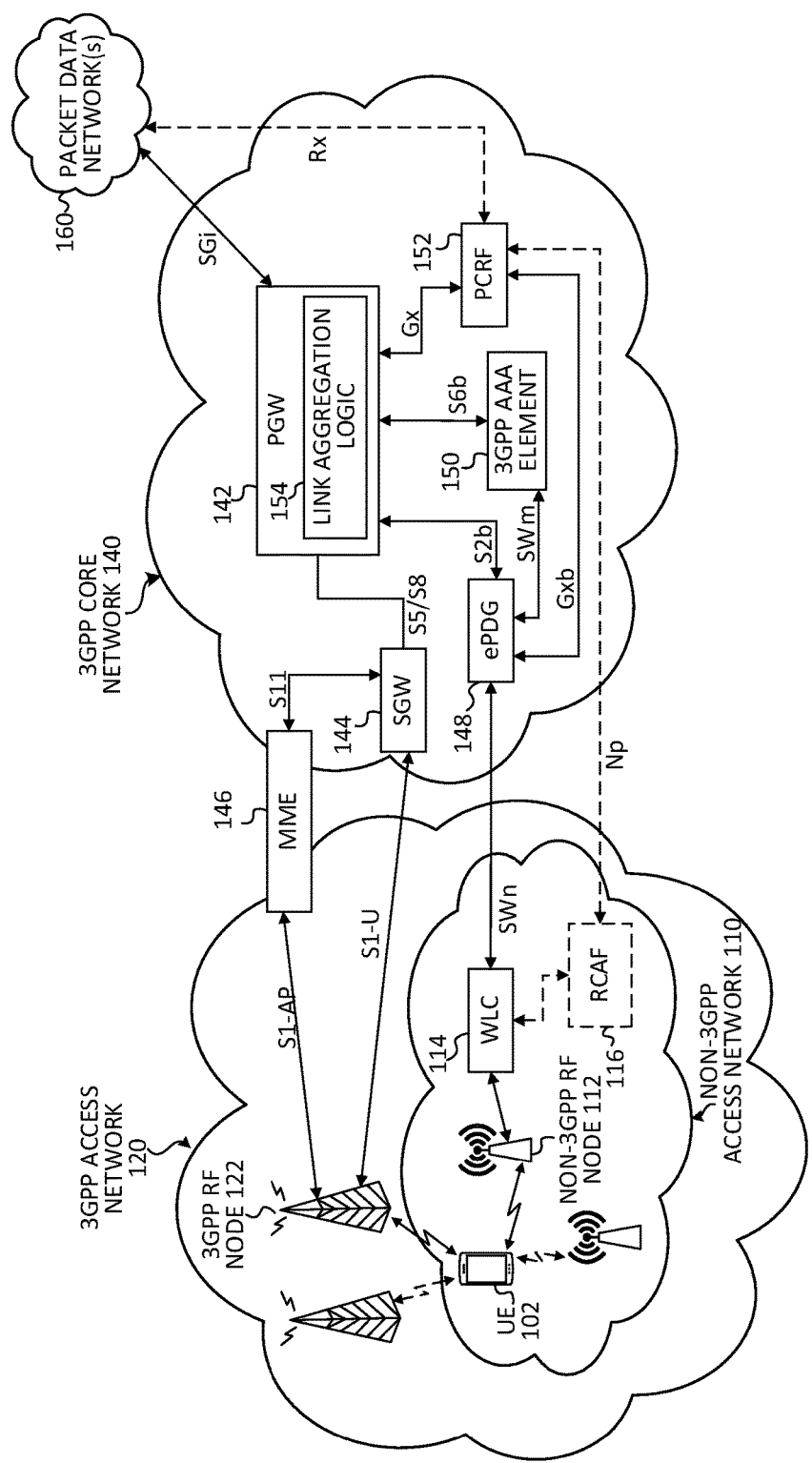
FIG. 1 is a simplified block diagram illustrating a communication system that can facilitate link aggregation using Network based IP Flow Mobility (NBIFOM) in a network environment according to one embodiment of the present disclosure.

Turning to FIG. 1, FIG. 1 is a simplified block diagram illustrating a communication system 100 to facilitate link aggregation using Network-based Internet Protocol (IP) Flow Mobility (NBIFOM) in a network environment according to one embodiment of the present disclosure. As referred to herein, the term 'link aggregation' can be used to refer to the ability to route traffic for a UE using one of a set of multiple access network (e.g., link) types that may be provisioned for communication system 100.

In one embodiment, the configuration illustrated in FIG. 1 may be tied to a Wireless Local Area Network (WLAN) and 3rd Generation Partnership Project (3GPP) interworking architecture such as, for example, an Evolved-Universal Mobile Telecommunications System (UMTS) Terrestrial Radio Access Network (E-UTRAN). The E-UTRAN architecture, generally referred to as 4th Generation (4G)/Long Term Evolution (LTE) architecture, can interface with an Evolved Packet System (EPS) core, generally referred to as the Evolved Packet Core (EPC). Typically, the E-UTRA is described in reference to the air-interface for LTE radio access. Alternatively, the depicted architecture can be applicable to other environments equally such as, for example, 5th Generation (5G) New Radio (NR) architectures and/or virtualized architectures such as, for example, a virtualized core and/or virtualized RAN (vRAN) architecture.

As referred to herein in this Specification, the term 'plane' can refer to a separation of traffic that can traverse a network. Three planes can typically be found in communication networks including: a data-plane, a control-plane and a management-plane. The data-plane typically carries user traffic, while the control-plane typically carries signaling traffic used to provide routing information for user traffic and the management-plane, a subset of the control plane, typically carries administrative traffic. As referred to herein in this Specification, the terms 'user-plane', 'data-plane' and 'user data-plane' can be used interchangeably.

As referred to herein in this Specification, the terms 'virtual machine', 'virtualized network function' and 'virtualized network functionality' can encompass an emulation of a computer system and/or computing platform operating based on the computer architecture and functions of a real or hypothetical computer, with particular embodiments involving specialized hardware, software, or a combination of both. In various embodiments, a virtualized network function (VNF), a virtual machine (VM), a virtualized network function component (VNFC), virtualized functionality and/or any virtualized network controller, element, module, aggregator, combinations thereof or the like as described herein may execute via a hypervisor-based virtualization or a container-based virtualization of a server (e.g., blade server, rack server, stand-alone server) using the server's hardware (e.g., processor and memory element) and/or operating system for a given virtualized network environment. In some embodiments, a Physical Network Function (PNF) may be referenced. A PNF is typically associated with a hardware radio head, which can be configured with one or more transmitters and receivers (and other associated hardware and/or software functionality) to facilitate over-the-air (OTA) Radio Frequency (RF) communications.

Various terms are used herein in reference to non-3GPP access network architectures (e.g., a WLAN) including: Basic Service Set (BSS), BSS Identifier (BSSID), Service Set Identifier (SSID), Extended Service Set (ESS) and ESS Identifier (ESSID). A non-3GPP RF node and its associated user equipment (UE), sometimes referred to as stations (STA), are typically referenced as a BSS. A BSS can be identified by a BSSID, which is typically the Medium Access Control (MAC) address of a given wireless AP. An SSID is typically a human readable name for a BSS. A collection of BSSs in a non-3GPP access network is typically referenced as an ESS, which can be identified using an ESSID. Often the ESSID and SSID are the same. OTA RF communications in a non-3GPP access network are facilitated through the use of packets, often referred to as 'frames'. Various frame types can be utilized in non-3GPP access network architectures including, but not limited to: management frames that enable communications between UEs and APs to be established and maintained; beacon frames that can carry information such as BSSID, SSID, timestamps, network information, etc. and data frames that can carry communication protocol information and/or data. Generally, frames include a control field, source and destination MAC addresses, and a payload or frame body. The control field can carry various control information and/or parameters including protocol version, frame type information, etc.

Before detailing various features of communication system 100, certain contextual information is provided to understand link aggregation for LTE-WLAN interworking architectures. Such information is offered earnestly and for teaching purposes only and, therefore, should not be construed in a way to limit the broad applications and teachings of the present disclosure. 3GPP Technical Specifications (TS), such as, for example, 3GPP Release 13 (Rel-13), define interworking between LTE access networks and non-3GPP access networks for different interworking architectures including coupled LTE-WLAN Aggregation (LWA), LTE WLAN Radio Level Integration with Internet Protocol Security (IPSec) Tunnel (LWIP), and Radio Access Network (RAN) Controlled LTE-WLAN Interworking (RCLWI).

Link aggregation refers to the ability to aggregate Internet Protocol (IP) flows for one or more UE across multiple access networks, which can be any combination of one or more 3GPP (e.g., LTE, 5G, etc.) communication link(s) and/or one or more non-3GPP (e.g., WLAN, Wi-Fi, WiGig, etc.) communication links. As referred to herein in this Specification, the term 'non-3GPP' is meant to cover unlicensed frequency spectrum access networks (e.g., Wi-Fi, WiGig, etc.) and the term '3GPP' is meant to cover licensed frequency spectrum access networks (e.g., LTE, 5G, etc.)

Current approaches for providing link aggregation are typically implemented in 3GPP access networks. Such current approaches include 3GPP and non-3GPP access networks that are coupled together in a combined RAN architecture and typically use Wi-Fi or other unlicensed access networks more generically for Data Radio Bearer (DRB) traffic only, with all signaling (e.g., control) traffic being exchanged over 3GPP access links. Coupling for these current approaches typically involve enhancing eNodeBs to interface with Wi-Fi APs and lend themselves to 'opportunistically' add Wi-Fi or other unlicensed connectivity to licensed connectivity. For indoor situations, however, non-3GPP access is typically the default access while 3GPP access is generally available opportunistically. Thus, using 3GPP access networks alone to provide link aggregation (as is currently defined in 3GPP standards) does not favor environments in which non-3GPP access is the default and/or preferred access network. Instead, a better solution is integrating link aggregation into the 3GPP core network thereby providing for the ability to provide link aggregation across potentially decoupled access networks.

Current 3GPP Specifications such as 3GPP TS 23.161 and 24.161 define one core-based approach to providing LTE-WLAN link aggregation; however, this approach involves only bearer switched solutions and not those where 3GPP and non-3GPP accesses can be decoupled and simultaneously aggregated.

In accordance with at least one embodiment, communication system 100 can overcome the aforementioned shortcomings of current 3GPP core-based bearer switching link aggregation approaches by enhancing a Packet Data Network (PDN) Gateway (PGW) to provide Layer 3 (L3) link aggregation functionality in order to enable simultaneous active connections for one or more UE via multiple decoupled access networks, which can be any combination of multiple 3GPP access networks and/or multiple non-3GPP access networks to facilitate NBIFOM in a network environment. Further, communication system 100 can provide for the ability to provide link aggregation using static or dynamic weighted cost multi-path routing techniques to enable load balancing of IP flow(s) across multiple 3GPP and/or multiple non-3GPP access networks.

The example architecture of FIG. 1 for communication system 100 includes a user operating user equipment (UE) 102, a non-3GPP access network 110, a 3GPP access network 120, a 3GPP core network 140 and one or more packet data network(s) (PDN(s)) 160. Non-3GPP access network 110 can include non-3GPP RF nodes 112 and a Wireless LAN Controller (WLC) 114. In at least one embodiment, non-3GPP access network 110 can further include a RAN Congestion Awareness Function (RCAF) 116. 3GPP access network 120 can include 3GPP RF nodes 122. 3GPP core network 140 can include a Packet Data Network (PDN) Gateway (PGW) 142, a Serving Gateway (SGW) 144, a Mobility Management Entity (MME) 146, an evolved Packet Data Gateway (ePDG) 148, a 3GPP Authentication, Authorization and Accounting (AAA) element 150, and a Policy and Charging Rules Function (PCRF) 152. PGW 142 can be provisioned with link aggregation logic 154.

In various embodiments, packet data network(s) 160 can include, but not be limited to, the Internet, operator IP services (e.g., IP Multimedia Subsystem (IMS)), third-party service(es) and/or service network(s), combinations thereof, or the like. An RF coverage area of 3GPP access network 120 can overlap an RF coverage area of non-3GPP access network 110 to facilitate simultaneous 3GPP and non-3GPP accesses for any UE (e.g., UE 102) that may be present in communication system 100.

Each of the elements of FIG. 1 may couple to one another through simple interfaces or through any other suitable connection (wired or wireless), which provides a viable pathway for network communications. As referred to herein, a physical (wired or wireless) interconnection or interface can refer to an interconnection of one element or node with one or more other element(s), while a logical interconnection or interface can refer to communications, interactions, and/or operations of elements with each other, which can be directly or indirectly interconnected, in a network environment. Physical and/or logical interfaces can be provided between various network elements of communication system 100 any manner depending on needs and implementations to facilitate link aggregation operations as discussed for various embodiments described herein.

Network elements (e.g., 3GPP RF node 122, MME 146, SGW 144, etc.) for 3GPP access network 120 and 3GPP core network 140 can interface with one another in any manner as may be defined by 3GPP standards (e.g., 3GPP TS 23.402, etc.), Internet Engineering Task Force (IETF) standards, European Telecommunications Standards Institute (ETSI) standards, Institute of Electrical and Electronics Engineers® (IEEE) standards (e.g., 802.11, 802.16, etc.), Wi-Fi Alliance® standards (e.g., HotSpot 2.0, WiGig, etc.), combinations thereof, or the like to facilitate link aggregation operations in accordance with teachings of the present disclosure. Further, network elements for non-3GPP access network 110 can interface with one another and/or with one or more elements of 3GPP access network 120 and/or 3GPP core network 140 in any manner as may be defined by 3GPP standards, IETF standards, ETSI standards, IEEE standards, Wi-Fi Alliance standards, combinations thereof, or the like to facilitate link aggregation operations in accordance with teachings of the present disclosure.

UE 102 can interface with any combination of non-3GPP RF nodes 112 and/or 3GPP RF nodes 122 simultaneously or separately (e.g., based on routing decisions provided by PGW 142) via a respective OTA RF communication link with each RF node. For the embodiment of FIG. 1, UE 102 is illustrated as having active simultaneous connections to a 3GPP RF node and a non-3GPP RF node. However, in accordance with various embodiments described herein, a UE that supports multiple accesses (e.g., UE 102) can have simultaneous connections to multiple access types, which can include any combination of multiple 3GPP accesses and/or multiple non-3GPP accesses.

3GPP RF nodes 122 can interface with MME 146 via an S1-Application Protocol (S1-AP) interface and can interface with SGW 144 via an S1-user data-plane (S1-U) interface. MME 146 can further interface with SGW 144 via an S11 interface. SGW 144 can further interface with PGW 142 via an S5 and/or S8 interface. In general, the S8 interface is used when a UE is roaming between different network operators and the S5 interface is a network internal interface for a particular network operator. PGW 142 can further interface with ePDG 148 via an S2b interface, can further interface with 3GPP AAA element 150 via an S6b interface, can further interface with PCRF 152 via a Gx interface, and can further interface with one or more packet data network(s) via a SGi interface for each network. PCRF 152 can further interface with ePDG 148 via a Gxb interface. In some embodiments, PCRF 152 can also interface with one or more network element(s) (not shown) of one or more packet data network(s) 160 via an Rx interface with each network element(s).

The ePDG 148 can further interface with WLC 114 via a SWn interface and can further interface with 3GPP AAA element 150 via a SWm interface. WLC 114 can further interface with non-3GPP RF nodes 112. For embodiments in which RCAF 116 is implemented for non-3GPP access network 110, the RCAF 116 can interface with WLC 114 and can further interface with PCRF 152 via an Np interface.

The non-3GPP access network 110 may provide an untrusted non-3GPP-based communications interface between UE 102 and 3GPP core network 140 via non-3GPP RF node 112 and WLC 114 that interfaces with ePDG 148, which interfaces with PGW 142 via the S2b interface. In various embodiments, non-3GPP access network 110 may include any type of unlicensed radio access such as, for example, IEEE 802.11 Wi-Fi, WiGig, which can include a Hotspot 2.0 access networks, IEEE 802.16 Worldwide Interoperability for Microwave Access (WiMAX), millimeter wave, combinations thereof, or the like depending on needs and implementations. Trusted non-3GPP accesses can also be provided via non-3GPP access network 110 in which embodiments 3GPP RF nodes can be directly connected to PGW 142 without ePDG connectivity, however, this is not shown in FIG. 1 in order to illustrate other features of the communication system.

In various embodiments, non-3GPP RF nodes 112 can be configured with one or more transmitter(s), receiver(s), processor(s), controller(s), memory element(s), storage, logic, etc. to facilitate OTA RF communications between UE 102 and non-3GPP RF nodes 112. In some cases, a non-3GPP RF node 112 can be referred to as an access point (AP). In various embodiments, any non-3GPP RF node (e.g., non-3GPP RF nodes 112) deployed in communication system 100 can be configured as any combination of Wi-Fi APs, Wi-Fi Hotspot 2.0 APs, WiGig APs, WiMAX APs, a Near Field Communication (NFC) AP, millimeter wave (mm.wave) APs, combinations thereof, or any other non-3GPP RF node as may be defined by IEEE standards, Wi-Fi Alliance standards, IETF standards, combinations thereof, or the like depending on needs and implementations.

In various embodiments, WLC 114 may be responsible for system wide wireless LAN functions, such as security policies, intrusion prevention, RF management, Quality of Service (QoS) functions, and/or mobility functions for non-3GPP access network 110 and one or more non-3GPP RF nodes. Although only one non-3GPP RF node 112 is illustrated in the example architecture shown in FIG. 1, it should be understood that non-3GPP access network 110 can include any number non-3GPP RF nodes depending on needs and implementations. For embodiments in which RCAF 116 is implemented, the RCAF 116 can report RAN User-Plane Congestion Information (RUCI) to the PCRF 152. In at least one embodiment, RUCI reporting from RCAF 116 to PCRF 152 can include non-3GPP access network instrumentation, which is discussed in further detail herein.

3GPP access network 120 may provide a 3GPP-based communications interface between UE 102 and 3GPP core network 140 via 3GPP RF nodes 122. In various embodiments, 3GPP access network 120 may include different Radio Access Networks (RANs) and/or Radio Access Technology (RAT) types such as a Global System for Mobile Communications (GSM), General Packet Radio Services (GPRS), Enhanced Data Rates for GSM (EDGE) radio access network (GERAN), generally referred to as a 2nd Generation (2G) access network; a Universal Mobile Telecommunications System (UMTS) Terrestrial radio access network (UTRAN), High Speed Packet Access (HSPA/HSPA+), generally referred to as a 3rd Generation (3G) access network; and/or a E-UTRAN, which can include a 4G, LTE/LTE-Advanced (LTE-A)/LTE-Advanced Pro and/or 5G New Radio (NR) access network.

In various embodiments, 3GPP RF nodes 122 can be configured with one or more transmitter(s), receiver(s), processor(s), controller(s), memory element(s), storage, etc. to facilitate OTA RF communications (e.g., 4G, 5G, etc.) between UE 102 and 3GPP RF nodes 122. In various embodiments, any combination of 3GPP RF nodes may be deployed in communication system 100 and can be configured as an evolved Node B (eNodeB or eNB), a Home eNode B (HeNB), a Node B (NodeB), a Home NodeB (HNB), a Base Station System combinations thereof, or any other 3GPP RF node as may be defined by 3GPP standards.

As referred to herein, the terms '3GPP access network', '3GPP-based', 'E-UTRAN', 'LTE', 'LTE access network', 'licensed access network', variations thereof, or the like can be used interchangeably to refer to various metrics (e.g., 3GPP metrics, LTE metrics, E-UTRAN metrics, etc.), links (e.g., 3GPP link, LTE link, E-UTRAN link, etc.), features, etc. that can be defined and/or provided via 3GPP access network 120; however, this is not meant to limit the broad scope of the present disclosure. It should be understood that the term '3GPP access network' can refer to any access network architecture for any access type (e.g., 3G, 4G, 5G, etc.) that may be defined by 3GPP as discussed for various embodiments described herein.

Further as referred to herein, the terms 'WLAN access network', 'WLAN', 'WLAN-based', 'non-3GPP', 'non-3GPP access network', 'Wi-Fi', 'Wi-Fi access network', 'unlicensed access network', variations thereof, or the like can be used interchangeably to refer to various metrics (e.g., non-3GPP metrics, WLAN metrics, Wi-Fi metrics, etc.), links (e.g., non-3GPP link, Wi-Fi link, WLAN link, etc.), features, etc. that can be defined and/or provided via non-3GPP access network 110; however, this is not meant to limit the broad scope of the present disclosure. It should be understood that the term 'non-3GPP access network' can refer to any access network architecture for any access type (e.g., Wi-Fi, WiGig, etc.) that may be defined by IEEE standards, Wi-Fi Alliance standards, IETF standards, combinations thereof, or the like as discussed for various embodiments described herein.

A DRB or, more generally, a 'bearer', can refer to a path, channel, tunnel or the like through which communications can be exchanged between two endpoints for a particular service, session, application, etc. (e.g., for an IP flow). Typically, bearers are referred to in association to communications exchanged between a UE and one or more elements or nodes of an EPC (e.g., 3GPP core network 140) for LTE architectures. At a minimum, a default bearer is established for a given UE, as defined in 3GPP standards, upon initial attachment of the UE to a given 3GPP RF node. In some embodiments, one or more dedicated bearers can be established for a given UE for one or more specialized services or applications provided to the UE such as, for example, a Voice over LTE (VoLTE) session, a data session, a Voice over IP (VoIP) session, a gaming session, combinations thereof, or the like.

As referred to herein in this Specification, an IP flow can refer to a sequence of packets that can be identified using packet header information (e.g., a transport layer header, a network layer header, etc.) such as, for example, 5-tuple packet information, 2-tuple packet information, etc. that is included in each packet of an IP flow. 5-tuple packet information identifies a source IP address, a destination IP address, a source port, a destination port and a transport protocol for a packet. 2-tuple packet information identifies a source-IP address and a destination IP address for a packet.

During operation, a UE (e.g., UE 102) seeking a connection with 3GPP core network 140 can include an NBIFOM container Information Element (IE) in a PDN-Connectivity-Request message sent to the core network. As referred to herein, an 'NBIFOM container IE' can also be referred to interchangeably as an 'NBIFOM container'. Among other information, an NBIFOM container can include an NBIFOM parameter list and one or more routing rules provisioned for a given UE. In some instances, an NBIFOM container can include multiple routing rules configured for a given UE for different IP flows (e.g., streaming video, Voice over IP (VoIP), Voice over Wi-Fi (VoWiFi), streaming music, gaming, etc.) based on various services, applications, etc. that may be utilized by the UE.

3GPP TS 24.161, version 13.3.0, published 2016-12, defines NBIFOM parameter lists that can include routing rules to facilitate NBIFOM according to 3GPP standards; however, current 3GPP standards do not support link aggregation for simultaneous active sessions across multiple 3GPP and/or multiple non-3GPP sessions.

In accordance with at least one embodiment, the system and method provided by communication system 100 can provide for enhancing NBIFOM containers to carry parameter list(s) that include routing rules for UEs that enable link aggregation across multiple access networks, which can include any combination of access(es) for 3GPP access network 120 and/or access(es) non-3GPP access network 110 for one or more UE that support simultaneous active sessions across multiple 3GPP and/or multiple non-3GPP links. Further, the system and method provided by communication system 100 can provide for enhancing NBIFOM containers to carry a parameter list that includes a vendor identification value that can be communicated to the PGW 142 during UE registration with 3GPP core network 140.

In various embodiments, a vendor identification value can be used to identify a particular UE brand (e.g., Apple®, Samsung®, LG®, etc.) and/or can be used to identify additional information associated with a particular UE such as, for example, model number, software version number, firmware version, serial number, combinations thereof, or the like, which can enable PGW 142, via link aggregation logic 154, to determine whether a particular UE supports weighted link aggregation (e.g., any combination of static and/or dynamic weight link aggregation) across multiple links using 3GPP access network 120 and/or non-3GPP access network 110. PGW 142 can be provisioned with a list of vendor identification values and an indication can be associated with each value that identifies whether a UE associated with a particular vendor supports weighted link aggregation. In at least one embodiment, UEs that support weighted link aggregation can have simultaneously active S5 and S2b interfaces such that IP flows can be aggregated across the 3GPP and/or non-3GPP links based on various conditions, described in more detail herein.

In accordance with at least one embodiment, NBIFOM routing rules (e.g., NBIFOM parameter lists(s)) carried in NBIFOM containers sent from UE 102 to the 3GPP core network 140) can be enhanced to indicate routing access information for one or more of a given IP flow for a given UE such that the routing access information for a particular IP flow identifies one or more access network(s) that can be utilized to facilitate communications for the particular IP flow. In at least one embodiment, routing access information for a particular NBIFOM routing can identify whether a particular IP flow can be routed across 3GPP accesses only, across non-3GPP accesses only, or across 3GPP and non-3GPP accesses. NBIFOM routing rules can be enhanced to carry other information such as static weight values, in addition to routing access information, to support various load balancing link aggregation operations that can be performed using any combination static and/or dynamic weight link aggregation techniques in accordance with various embodiments described herein.

During operation, based on a determination that a UE is authorized to connect to the 3GPP core network 140 and supports weighted link aggregation, PGW 142 can store NBFIOM routing rule(s) received from the UE during UE bearer activation (e.g., default or dedicated) that identify, among other information, one or more IP flow(s) for the UE that can be aggregated across multiple accesses including any combination of accesses for 3GPP access network 120 and/or non-3GPP access network 110.

To facilitate link aggregation across multiple accesses for 3GPP access network 120 and/or non-3GPP access network 110 once a connection is established for a given UE (e.g., UE 102) that supports weighted link aggregation, PGW 142 via link aggregation logic 154 can, upon receiving an IP packet for the UE, match the IP packet to at least one routing rule stored the UE to determine whether an IP flow associated with the IP packet can be aggregated across multiple accesses. The matching can be performed using flow tuple information included in the IP packet. In some instances, an IP packet may match multiple routing rules having different priority levels. In such instances, the PGW 142 can first attempt to select an access network for handling the IP flow associated with the packet based on the highest priority routing rule.

Based on a determination that a UE supports link aggregation across multiple accesses, PGW 142 via link aggregation logic 154 can select an access network to facilitate communications for the IP flow. In various embodiments, access network selection for a particular IP flow can be based on either a static weight configured for one of the access networks or can be based on a dynamic weight of access network QoS and bandwidth availability for each access network that can be determined using various metrics gathered and/or calculated for the access networks such that the metrics are associated with the capability of an access network to facilitate communications for the IP flow. In at least one embodiment, determination of whether to use static or dynamic weight link aggregation for routing IP flows of a given UE can be based on whether a static weight has or has not been received from the UE (e.g., within the routing rules of an NBIFOM container) for a given IP flow.

As referred to herein in this Specification, the terms 'metric', 'routing metric', 'cost metric', and variations thereof can refer to a Key Performance Indicator (KPI) that can be used to characterize the communication quality of an access network, such that the communication quality represents the capability of a particular access network to facilitate communications for an IP flow for a given UE. In various embodiments, various metrics such as a 3GPP quality metric(s) for 3GPP access network 120 for a particular access type (e.g., 4G, 5G, etc.) and a non-3GPP quality metric(s) for non-3GPP access network 110 for a particular access type (e.g., Wi-Fi, WiGig, etc.) can be determined by PGW 142, via link aggregation logic, based on instrumentation gathered for 3GPP access network 120, non-3GPP access network 110, and/or UE(s) operating within the system. As referred to herein, the term 'instrumentation' can refer to reports, measurements, calculations, information, combinations thereof, or the like that can be used by PGW 142, via link aggregation logic 154, to determine multiple quality metrics for any combination of accesses for 3GPP access network 120 and/or for non-3GPP access network 110 in order to perform dynamic weight link aggregation for one or more IP flow(s), as discussed in further detail below.

In various embodiments, NBIFOM routing rules configured for one or more IP flow(s) for a given UE can be configured to utilize any combination of static and/or dynamic weight link aggregation. For embodiments in which aggregation for a particular IP flow is to be provided using static weight link aggregation, the NBIFOM routing rule associated with the particular IP flow can be enhanced to identify routing access information that indicates that the IP flow can be aggregated across multiple accesses and that a static weight value that is to be used by the PGW 142, via link aggregation logic, to select an access network for handling communications for the IP flow. A service provider may adjust the static weight to bias the IP flow towards or away from a particular access network. For embodiments in which aggregation for a particular IP flow is to be provided using dynamic weight link aggregation, the NBIFOM routing rule associated with the particular IP flow can be enhanced to carry routing access information that indicates that a particular IP flow can be aggregated across multiple accesses with no static weight value included with the particular rule.

During operation in at least one embodiment, PGW 142 can receive a packet for a given IP flow of a given UE (e.g., UE 102) and, based on a determination that the UE supports NBIFOM link aggregation for the IP flow (e.g., via routing access information associated with the IP flow), PGW 142, via link aggregation logic 154, can select the an access type for 3GPP access network 120 or for the non-3GPP access network 110 to facilitate communications for the IP flow using either static weight or dynamic weight link aggregation techniques as discussed for various embodiments described herein. In at least one embodiment, selecting an access type for an access network to facilitate communications for an IP flow for a given UE can include assigning the IP flow to a bearer established for the UE for the selected access network.

Static Weight Link Aggregation

For embodiments in which NBIFOM aggregation for a particular IP flow is to be performed using static weight link aggregation (e.g., based on matching an IP packet for the particular IP flow to an NBIFOM routing rule that identifies a static weight that is to be used for access network selection), PGW 142, via link aggregation logic 154, can calculate a hash value (HV) of flow tuple information for the packet (e.g., 5-tuple, 2-tuple, etc.), compare the calculated HV to the static weight value associated with the rule, and select an access type for either 3GPP access network 120 or non-3GPP access network 110 to facilitate communications for the IP flow based on the comparison.

For example, in at least one embodiment during operation, PGW 142 via link aggregation logic can perform modulo (MOD) hashing operations on the flow tuple information on each packet of an IP flow to ensure that all packets for a particular IP flow are handled by a same access technology; thus, avoiding out of sequence packet arrivals within the particular IP flow. In at least one embodiment, a hash value (HV) for each flow tuple of each packet of an IP flow can be calculated using an equation HV(flow tuple)=HASH(flow tuple) MOD 100, where 'HASH(flow tuple)' represents the hash of a flow tuple according to a given hashing function, which can be configured for link aggregation logic 154.

In various embodiments, a hashing function can be any function that can be used to map input data to output data of a fixed size. In various embodiments, different hashing function types can be configured for link aggregation logic depending on the size (e.g., number of bits) of flow tuple fields and/or the number of flow tuple fields to be used for hashing operations under the constraint that a hash function type returns a same output hash value for same input values (e.g., the hash function is deterministic). In various embodiments, the flow tuple used for the hashing can use 5-tuple information, 2-tuple information or any other flow tuple information that can be assumed to remain constant for each packet of an IP flow such that the hash of the flow tuple for each packet remains unchanged across all packets for the IP flow.

A resultant hash value calculated for each flow tuple of each packet of a given IP flow can be compared against a threshold value or ranges of threshold values associated with normalized routing metrics for a number of access networks to select an access network to which to route packets for the IP flow. For example, in at least one embodiment, a hash value calculated for each flow tuple of a given IP flow can be a static weight value associated with a given routing rule (e.g., HV static weight or HV static weight) to enable PGW 142 via link aggregation logic 154 to selecting an access type for an access network to facilitate communications for the given IP flow.

Dynamic Weight Link Aggregation

For embodiments in which NBIFOM aggregation for a particular IP flow is to be performed using dynamic weight link aggregation (e.g., based on matching an IP packet for the particular IP flow to an NBIFOM routing rule that does not have a static weight value associated thereto), PGW 142, via link aggregation logic 154, can perform link aggregation based on quality metrics determined for each link and a QoS class associated with each IP flow, which can be identified via a QCI that can identify different types of Guaranteed Bit Rate (GBR) traffic having a QCI in a range of 1-4 and non-GBR traffic having a QCI in a range of 5-9.

Aggregation between GBR and non-GBR traffic can be handled differently by PGW 142 via link aggregation logic 154. Quality metrics for any combination of 3GPP access network types and/or non-3GPP access network types can be determined by PGW 142, via link aggregation logic based on various instrumentation gathered by PGW 142 for various access network types.

For example, a 3GPP quality metric(s) for one or more 3GPP access type(s) can be determined by PGW 142, via link aggregation logic 154, based on various respective 3GPP instrumentation gathered by PGW 142 for the 3GPP access network 120 and/or for a particular UE for which link aggregation is to be provided. Non-3GPP quality metric(s) for one or more non-3GPP access type(s) can also be determined by PGW 142, via link aggregation logic 154, based on various respective 3GPP instrumentation gathered by PGW 142 for the 3GPP access network 120 and/or for the particular UE for which link aggregation is to be provided.

In various embodiments, instrumentation can include can include, but not be limited to: load, channel utilization, resource utilization, signal strength and/or quality information (e.g., Signal-to-Noise-Ratio (SNR), Signal-to-Interference-plus-Noise-Ratio (SINR), Received Signal Strength Indicator (RSSI), Received Channel Power Indicator (RCPI), Reference Signal Received Power (RSRP), Reference Signal Received Quality (RSRQ), Common Pilot Channel (CPICH) energy per chip to total Power Spectral Density (PSD) at the UE antenna (Ec/Io), CPICH Received Signal Code Power (RSCP), etc.), throughput (e.g., bits per second (bps), etc.), error rate (e.g., Block Error Rate (BLER) for Hybrid Automatic Repeat Request (HARQ) processes or other processes, etc.), WLAN admission capacity, uplink (UL) and/or downlink (DL) bandwidth, station count (e.g., for non-3GPP accesses), combinations and/or variations thereof, or the like.

In various embodiments, instrumentation can also include UE service instrumentation such as, for example, Quality of Service (QoS) information (e.g., QoS Class Identifier (QCI), Guaranteed Bit Rate (GBR), Maximum Bit Rate (MBR), etc.), Modulation and Coding Scheme (e.g., Quadrature Amplitude Modulation (QAM), Quadrature Phase Shift Keying (QPSK), etc.), resource allocation information (e.g., Physical Resource Block (PRB) allocations for one or more subframes), combinations and/or variations thereof, or the like.

For example, both PGW 142 and the 3GPP RF node to which a given UE is connected (e.g., a particular 3GPP RF node 122 for UE 102) have knowledge pertaining to various 3GPP quality related instrumentation associated with traffic for the UE for one or more IP flow(s). For example, QoS instrumentation such as QCI, MBR, GBR, or the like are known to the PGW and the 3GPP RF node for each bearer (e.g., default and dedicated, depending on UE session(s) established) associated with the given UE. Further, 3GPP quality related instrumentation such as the number of resources (e.g., the number PRBs) allocated to UE transmissions, for uplink transmissions from the UE and/or downlink transmissions to the UE as well as the Modulation and Coding Scheme (MCS) applied to the transmissions is known to the 3GPP RF node.

In general, MCS for transmissions can include QPSK and QAM including 16QAM, 64QAM and 256QAM with modulation order increasing from QPSK to 256QAM. Different coding schemes can be applied to different modulation types to arrive at an MCS for transmission. In general, a higher SINR for a UE can result in a higher MCS being selected for the UE, which, in turn can provide for a higher throughput rate for the UE.

PGW 142, via link aggregation logic 154, can also gather non-3GPP quality related instrumentation for non-3GPP access network 110. In various embodiments, non-3GPP quality related instrumentation can be of different types including: aggregate instrumentation that can be based on aggregate information, reports, calculations or the like associated with multiple communications using a particular non-3GPP RF node to which a UE is connected (e.g., a particular 3GPP RF node 112 for UE 102); individual instrumentation that can be based on individual information, reports, calculations or the like associated with an individual UE communication; and/or RRC WLAN instrumentation that can be based on information, reports, calculations or the like associated with a given UE (e.g., UE 102) that is communicated to PGW 142 via RCAF 116.

Per 3GPP LWIP/E-UTRAN specifications, the E-UTRAN is operable to trigger Radio Resource Control (RRC) measurements by a UE for a non-3GPP access network. In various embodiments, non-3GPP quality related instrumentation can include, but not be limited to: Basic Service Set (BSS) Load; Hotspot 2.0 (HS2.0) Wireless Area Network (WAN) metrics as defined by HS2.0 guidelines; WLAN signal strength information; WLAN signal quality information; uplink metrics calculated by a given UE; measured uplink UE throughput; RRC measurement information including, but not limited to uplink and/or downlink bandwidth, channel utilization, and/or WLAN Admission Capacity information); BSS Identifier(s) (BSSID(s); Service Set Identifier(s) (SSID(s)); Homogenous Extended SSID(s) (HESSID(s)); combinations thereof; or the like. In various embodiments, WLAN signal strength information can include RSSI, RCPI, combinations thereof, or other similar signal strength information indicating the signal strength experienced by a particular UE for the non-3GPP access network.

Typically, a HS2.0 deployment is a type of non-3GPP access network configured by a Hotspot operator and a Hotspot service provider where the operator deploys and operates the network and the service provider provides network services and operates the AAA infrastructure to authenticate subscribers. During operation in at least one embodiment for a HS2.0 network, a given UE (e.g., UE 102) can query an Access Network Query Protocol (ANQP) server using one or more Generic Advertisement Service (GAS) query frames and can receive one or more ANQP element(s) in response. The UE can recover information from the ANQP element(s) that can aid the UE in network selection (e.g., selecting a non-3GPP RF node to which to attach), association procedures, and authentication procedures with the HS2.0 network. In at least one embodiment as prescribed by HS2.0 guidelines, WAN metrics can include a WAN metrics Hotspot 2.0 ANQP element, which can include information about a WAN link that connects a non-3GPP RF node to the a packet data network 160 such as, for example, Link status (e.g., Link up, Link down, Link in test state); WAN link symmetry, which indicates whether a link speed is the same in the uplink and downlink (e.g., symmetric or asymmetric); Downlink speed, which is nominal in kilobits per second (kbps); Uplink speed (nominal in kbps); Downlink load and/or Uplink load (e.g., BSS load); and/or Load Measurement Duration, which is the time interval over which a WAN interface device (e.g., a WLAN AP or edge router) averages its load measurement.

In at least one embodiment, non-3GPP quality related instrumentation including, but not limited to, RRC measurement reporting for the non-3GPP access network performed by UE 102, can be sent to PGW 142 via 3GPP RF node 122 to which UE 102 is connected. In another embodiment, WLC 114 can be configured to signal non-3GPP quality related instrumentation to RCAF 116, which can perform aggregated RUCI reporting to send the instrumentation to PCRF 152, which can signal the instrumentation to PGW 142 via Gx Credit-Control-Answer (CCA) signaling.

In various embodiments, current 3GPP quality related instrumentation (e.g., for use by PGW 142 at a particular time) and current non-3GPP quality related instrumentation for the particular time can be gathered periodically based on configuration by a network operator and/or service provider, can be event-driven based on certain conditions (e.g., UE re-association, UE movement, rush hour, an entertainment event occurrence (e.g., a concert, sporting event), etc.), can be based on a trigger associated with identification of a particular IP flow and/or flow type, combinations thereof, or the like depending on needs an implementations.

The examples of instrumentation discussed herein are only a few of the many types of instrumentation that can be gathered to facilitate link aggregation in accordance with the teachings of the present disclosure. Virtually any instrumentation and/or any combination of instrumentation can be gathered within communication system 100 to facilitate link aggregation and, thus, are clearly within the scope of the teachings of the present disclosure.

In at least one embodiment, PGW 142, via link aggregation logic 154, can determine 3GPP quality metric(s) for one or more 3GPP access type(s) to use for link aggregation by performing calculations based a function relating currently available 3GPP access quality related instrumentation in terms of QoS, channel utilization, and bandwidth availability for the access type for access type(s) for the 3GPP access network 120. In at least one embodiment, PGW 142, via link aggregation logic 154, can determine non-3GPP quality metric(s) for one or more non-3GPP access type(s) by performing calculations based on a function relating currently available non-3GPP access quality related instrumentation in terms of QoS, channel utilization, and bandwidth availability for access type(s) the non-3GPP access network 120.

In at least one embodiment, access quality in terms of QoS can relate to a combination of packet delay and packet loss. Packet delay and packet loss are typically used to define IP level packet characteristics. In the case of 3GPP access networks (e.g., a particular access type for 3GPP access network 120), packet delay and packet loss in the uplink and/or downlink direction(s) for each of one or more bearer(s) can be measured to determine the access quality in terms of QoS for each bearer(s) and can be reported to PGW 142 for further processing. In the case of non-3GPP access networks (e.g., a particular access type for non-3GPP access network 110) such as Wi-Fi access networks, in at least one embodiment, upstream (e.g., uplink) and downstream (e.g., downlink) QoS can be measured by using Wi-Fi Multi-Media (WMM) functionality, which can be operating on both a non-3GPP RF node (e.g., a particular non-3GPP RF node 112) and a WLAN client (e.g., UE 102). In at least one embodiment, WMM functionality can be used to measure upstream and/or downstream QoS at the application level (e.g., for different applications running on a UE such as, for example, Voice over IP (VoIP) applications, streaming multimedia applications, etc.). QoS measurement instrumentation resulting from WMM measurements can be reported PGW 142 for further processing.

3GPP quality metric(s) calculated using current 3GPP instrumentation and/or non-3GPP quality metric(s) calculated using current non-3GPP instrumentation can represent a current state for multiple accesses that can indicate their ability to handle certain IP flow(s) and can be referred to herein using the term 'access state'. A 3GPP quality metric for a particular access type can be referred to herein using the term 'Q3GPP(type)' and a non-3GPP quality metric for a particular access type can be referred to herein using the term 'Qnon-3GPP(type)'. In at least one embodiment, bandwidth (BW) availability can be determined by subtracting the used bandwidth for a bearer and/or channel from the bandwidth allocated for the bearer and/or the channel (e.g., Available BW=Allocated BW−Used BW). In at least one embodiment, a Q3GPP(type) metric can be determined using a function as represented by 'Q3GPP(type)=function (current 3GPP access type quality in terms of QoS, channel utilization, bandwidth availability). In at least one embodiment, a Qnon-3GPP(type) metric can be determined using a function as represented by 'Qnon-3GPP(type)=function(current 3GPP access type quality in terms of QoS, channel utilization, bandwidth availability)'.

To perform dynamic weight link aggregation for GBR IP flows in which a dedicated bearer is to be utilized to handle the IP flows (e.g., for VoLTE traffic, etc.), PGW 142, via link aggregation logic 154, can be provisioned to select a particular access type (e.g., 4G, 5G, etc.) for 3GPP access network 120 as the preferred access network to handle the IP flows unless it is determined that the particular 3GPP access network is unable to meet the QoS level and/or GBR requirements for a particular IP flow. In at least one embodiment, PGW 142, via link aggregation logic 154 can determine whether a particular access type for the 3GPP access network is able or unable to meet the QoS level and/or GBR requirements for a particular flow by comparing the QoS/GBR for the flow to the QoS/GBR allocated to one or more dedicated bearer(s) that may have been established for one or more access type(s) for the 3GPP access network as may be supported by a particular UE.

Based on a determination that a particular access type for 3GPP access network 120 is unable to meet the QoS and/or GBR requirements for a particular IP flow, PGW 142, via link aggregation logic 154, can perform link aggregation using a Mode Selection Function, described in more detail below.

To perform dynamic weight link aggregation for non-GBR IP flows and/or for GBR IP flows that can't be handled by a particular access type for 3GPP access network 120, PGW 142, via link aggregation logic 154, can select an access type for access network to handle a particular IP flow using a Mode Selection Function that can utilize the access state (e.g., quality metrics) for the access network types calculated for one or more access network type(s) for 3GPP access network 120 and/or for non-3GPP access network 120) and a minimum quality value, referred to herein using the term 'Qmin', that can represent either: 1) a minimum required QoS level and minimum required bandwidth needed to support a single IP flow on a non-GBR bearer; or 2) a QoS level requirement and/or GBR requirement needed to support a particular GBR IP flow. For non-GBR traffic, the value of Qmin can be set by a network operator and/or service provider depending on needs and implementations.

A Mode Selection Function can be provisioned for link aggregation logic 154 as shown below in TABLE 1, which illustrates an example 'ModeSelectionFunction' that can be utilized (e.g., executed by one or more processor(s) configured for PGW 142) to perform dynamic weight link aggregation in accordance with one potential embodiment.

TABLE 1

Example ModeSelectionFunction

ModeSelectFunction ( )
{
If (Q3GPP(type) ≥ Qmin && Qnon-3GPP(type) ≥ Qmin ) Then mode = RoundRobin(3gpp(type), non-3gpp(type))
Elseif (Q3GPP(type) < Qmin) Then mode = non-3gpp(type)
Elseif (Qnon-3GPP(type) < Qmin) Then mode = 3gpp(type)
}

As illustrated in TABLE 1, operations performed utilizing the example ModeSelectionFunction can, in at least one embodiment, include performing a comparison between Q3GPP(type) metrics and Qmin and between Qnon-3GPP (type) metrics and Qmin to determine if both metrics meet or exceed Qmin and, if so, PGW 142, via link aggregation logic 154, can select either a particular access type for the 3GPP access network 120 (e.g., 3gpp(type)) or a particular access type for the non-3GPP access network 110 (e.g., non-3GPP(type)) to handle a particular IP flow using a Round-Robin technique (e.g., alternating assignment of IP flows between each access network to maintain equal or a predetermined load balance between the access networks). Otherwise, based on a determination that a Q3GPP(type) metric is less than Qmin, then PGW 142, via link aggregation logic 154, can select an access type for the non-3GPP access network 110 to handle the particular IP flow or, based on a determination that the Qnon-3GPP metric is less than Qmin, then PGW 142, via link aggregation logic 154, can select the 3GPP access network 120 to handle the particular IP flow.

In at least one embodiment, PGW 142, via link aggregation logic 154, can store a per-UE mapping of access network selection for each IP flow for which access network selection is performed using a Mode Selection Function (e.g., example ModeSelectionFunction as shown in TABLE 1). Upon selecting an access network to handle a particular IP flow, PGW 142, via link aggregation logic 154, can store an association identifying an access network and/or access network type (e.g., Access Mode) selected for a particular IP flow with flow tuple information that can be used to identify the particular IP flow in a data structure provisioned for PGW 142. In some embodiments, an indication of a dedicated bearer associated with an Access Mode selected for a particular IP flow can also be stored in the data structure. In at least one embodiment, a UE-IP Flow/Access Mapping data structure can be maintained (e.g., entries can be added, removed, and/or updated) by PGW 142, via link aggregation logic 154 to enable the PGW subsequent packets associated with a particular IP flow to be routed across a same access network without needing to perform Mode Selection Function operations on each packet of the IP flow. An example UE-IP Flow/Access Mapping data structure is shown below in TABLE 2.

TABLE 2

Example UE-IP Flow/Access Mapping Data Structure

| IP Address | Port | Access Mode |
| --- | --- | --- |
| 10.5.7.7 | 34566 | 3GPP |
| 10.5.7.7 | 34788 | non-3GPP |

TABLE 2-continued

Example UE-IP Flow/Access Mapping Data Structure

| IP Address | Port | Access Mode |
|---|---|---|
| 10.5.7.7 | 34677 | 3GPP (Dedicated) |
| 10.5.7.7 | 43343 | 3GPP |
| 10.5.7.7 | 76842 | non-3GPP |
| ... | | |

In at least one embodiment, IP address and Port included in the example UE-IP Flow/Access data structure shown in TABLE 2 can be source IP address and Port in the case of uplink traffic and destination IP address and Port in the case of downlink traffic for IP flows handled by PGW 142 for a given UE. Although, the example UE-IP Flow/Access data structure shown in TABLE 2 only identifies IP flows for one UE, it should be understood that information for other UEs and associated IP flows can also be stored in the data structure. Further, it should be understood that any combination of flow tuple information can be stored in such a data structure maintained by PGW 142 depending on needs and implementations to enable the PGW 142, via link aggregation logic 154, to perform packet routing for one or more IP flow(s) following an access mode (e.g., access network) selection performed using an Mode Selection Function provisioned for the PGW 142.

Consider an operational example involving File Transfer Protocol (FTP) file transfers as an application for a UE (e.g., UE 102) that supports simultaneous 3GPP and non-3GPP accesses. Say, for example, that UE 102 initiates a bearer request toward 3GPP core network 140 for a FTP File Transfer type application. PGW 142, via link aggregation logic 154, can check the current state of the 3GPP access network 120 toward UE 102 to determine whether there is a possible 3GPP bearer having a QoS and available bandwidth that can be allocated to the UE from the 3GPP RF node (e.g., 3GPP RF node 112) to which it is attached. An FTP file transfer typically requires QoS in terms of 300 millisecond packet delay and $10^{-6}$ packet loss. Based on a determination that a bearer for the 3GPP access network cannot satisfy the QoS for the FTP File Transfer application, PGW 142, via link aggregation logic 154, can gather 3GPP instrumentation and non-3GPP instrumentation to determine quality metrics (e.g., Q3GPP(type) and Qnon-3GPP(type)) that can be used to perform dynamic weight link aggregation using a Mode Selection Function (e.g., example ModeSelectionFunction as shown in TABLE 1) to select an access network to handle the flow.

Accordingly, the system and method provided by communication system 100 can provide an IP aggregation solution on multiple accesses, which can include any combination of 3GPP (e.g., 4G, 5G, etc.) and/or non-3GPP (e.g., Wi-Fi, WiGig, etc.) accesses using NBIFOM on S5 and S2b interfaces by applying static or dynamic weighted cost multipath techniques in accordance with various embodiments described herein. In at least one embodiment, the solution can include enhancing NBIFOM containers to carry additional information such as routing access information and, in some cases, a static aggregation weight value, for each of one or more routing rule(s) that are to be associated with each of one more IP flow(s) that may be utilized by one or more UE that may be present within communication system 100 and that support aggregation across both 3GPP and non-3GPP communication links.

Figure 2:
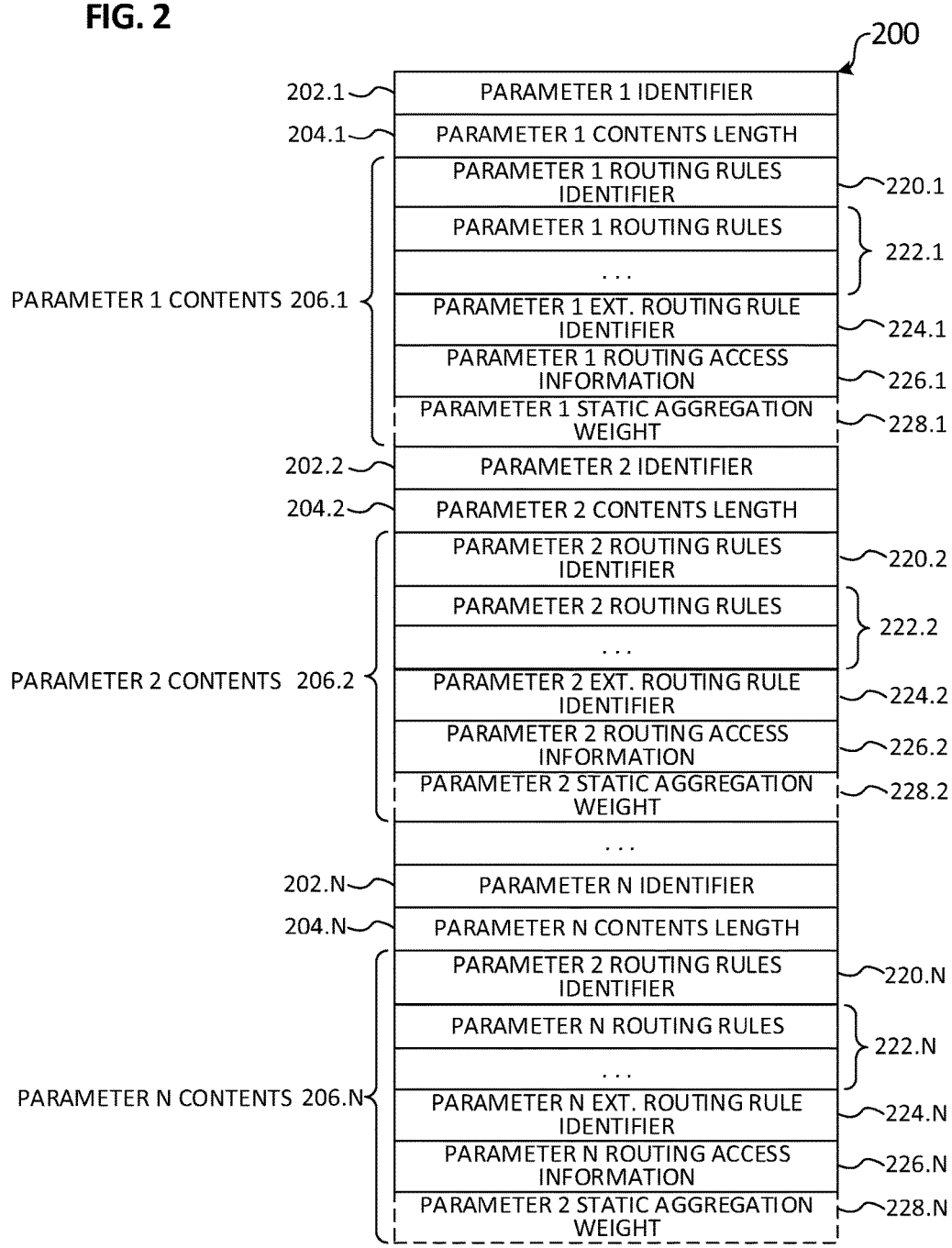
FIG. 2 is a simplified schematic diagram illustrating example details that can be associated with an example NBIFOM container Information Element (IE) that can be enhanced to include additional information to facilitate link aggregation using NBIFOM in accordance with various potential embodiments.

Referring to FIG. 2, FIG. 2 is a simplified schematic diagram illustrating example details that can be associated with an example NBIFOM container IE 200 that can be enhanced to include additional information to facilitate NBIFOM link aggregation in accordance with various potential embodiments.

In at least one embodiment, example enhanced NBIFOM container IE can include a list of 'N' NBIFOM parameters 1–N, where N can be any positive integer value. Each NBIFOM parameter included in example enhanced NBIFOM container IE 200 can be include a parameter identifier field, a parameter contents length field, and a number of parameter contents field(s). Each field carried in an enhanced NBIFOM container can be 8-bits in length, thus, the fields can be arranged in octets. For example, a first parameter (parameter 1) is identified in the example enhanced NBIFOM container IE 200 including a first parameter identifier field 202.1 set to a parameter 1 identifier, a parameter contents length field 204.1 set to a value corresponding to the length of the contents (e.g., a number of octets) included for the first parameter, and various content fields 206.1.

Contents carried in content fields can be identified using a parameter identifier field that precedes a given type of content and identifies the content type. 3GPP Technical Specification (TS) 24.161 V14.0.0, published March, 2017 specifies a number of parameter identifiers, in which identifier values of hexadecimal (hex) '0x09' thru '0xFF' are currently unassigned in the standard.

For the first parameter, a routing rules identifier field 220.1 can be set to '0x04' as defined 3GPP TS 24.161, Section 6.1.1, which can be followed by a number of routing rules fields 222.1. The routing rules fields can include a rule length field, a rule identifier field, an operation code, a routing access identifier, a routing rule priority, and a number of routing filter fields. Routing filter fields can include information such as, source IP address (e.g., IP version 4 (IPv4) and/or IP version 6 (IPv6)), destination IP address, port information, etc. that can be used to identify an IP flow to which the routing filter is to be applied, as defined in 3GPP TS 24.161, Section 6.1.4.

According to 3GPP TS 24.161, Section 6.1.4, a routing access identifier is a 2-bit field that can be set to binary '01' to indicate that a 3GPP access network is to be used for routing traffic for the IP flow identified by a routing rule or can be set to binary '10' to indicate that a non-3GPP access network is to be used for routing traffic for the IP flow identified by the routing rule. However, embodiments of communication system 100 provide for the ability to set the routing access identifier to binary '00' or '11' and instead identify one of three possibilities using a routing access information field that can be included in an enhanced NBIFOM container IE.

As parameter identifier values '0x09' thru '0xFF' are currently unassigned in 3GPP TS 24.161, embodiments of communication system 100 provide for the ability to provision one of these currently unassigned values as a newly defined content type for a parameter of an enhanced NBIFOM container IE such that the new content type can be referred to herein as an 'NBIFOM Extended Routing Rule' content type. As shown for example enhanced NBIFOM container IE 200, the first parameter in the parameter list can be enhanced to include an extended routing rule identifier field 224.1 that can be set to a currently unassigned value say, for example '0x09' that can be used identify the NBIFOM Extended Routing Rule' content type, which can be followed by an octet routing access information field 226.1 and, in some embodiments, an octet static aggregation weight field 228.1. As a static aggregation weight may not be included with all routing rules, a static aggregation weight field may not be included with all routing rules contained in an enhanced NBIFOM container IE.

In at least one embodiment, a routing access information field can be defined for an enhanced NBIFOM container IE to include at least 2-bits that can be defined to identify one of: '3GPP' accesses only (e.g., binary '01'), 'non-3GPP' accesses only (e.g., binary '10'), or 'aggregated 3GPP plus non-3GPP' accesses (e.g., binary '11') as the routing access network(s) that are to be used for routing traffic for an IP flow identified by a given routing rule. In other embodiments, more than two bits may be used to indicate aggregation across various combinations of access network types. In at least one embodiment, a static aggregation weight field can be defined for an enhanced NBIFOM container to include a number of bits that can be defined to identify an integer value less than 100 that is to be used for routing traffic for an IP flow identified by a given routing rule using static weight link aggregation.

Additional parameters 2–N are also shown in the embodiment of FIG. 2, each of which can also include fields as discussed above for the first parameter. For example, a second parameter, parameter 2, can include an identifier field 202.2 set to a parameter 2 identifier, a parameter contents length field 204.2, and various content fields 206.2 including a routing rules identifier field 220.2, a number of routing rules fields 222.2, an extended routing rule identifier field 224.2, a routing access information field 226.2, and optionally, a static aggregation weight field 228.2. An Nth parameter, parameter N, can also include an identifier field 202.N set to a parameter N identifier, a parameter contents length field 204.N, and various content fields 206.N including a routing rules identifier field 220.N, a number of routing rules fields 222.N, an extended routing rule identifier field 224.N, a routing access information field 226.N, and optionally, a static aggregation weight field 228.N.

Any number of parameters can be included in a parameter list for an enhanced NBIFOM container IE. In some embodiments, additional parameters can be included an enhance NBIFOM container IE, as may be defined by standards, or the like.

Referring to FIGS. 3A-3D, FIGS. 3A-3D are a simplified interaction diagram 300 illustrating example details that can be associated with providing link aggregation using NBIFOM in accordance with various potential embodiments. In particular, FIGS. 3A-3D illustrate example details that can be associated with providing link aggregation over simultaneous active 3GPP and non-3GPP links. Different access network types for the 3GPP access network and the non-3GPP access network are not illustrated for the embodiment of FIGS. 3A-3D; however, this is not meant to limit the broad scope of the present disclosure, which in various embodiments can provide for the ability to provide link aggregation over multiple accesses including any combination of 3GPP access network type(s) and/or non-3GPP access network type(s). As referred to for the embodiment of FIGS. 3A-3D, quality metrics can be discussed generally as a 3GPP access network quality metric 'Q3GPP' and a non-3GPP access network quality metric 'Qnon-3GPP' and a ModeSelectionFunction function can be modified to generally consider these metrics (e.g., as opposed to 'Q3GPP (type)' and 'Qnon-3GPP(type)' metrics for different access network types) in performing weighted link aggregation.

FIGS. 3A-3D include UE 102, a particular non-3GPP RF node 112 and WLC 114 (shown together as non-3GPP RF node/WLC 112/114), a particular 3GPP RF node 122, MME 146, ePDG 148, PGW 142, 3GPP AAA element 150, PCRF 152, RCAF 116, and a packet data network 160. For the embodiment of FIGS. 3A-3D, it can be assumed that UE 102 has both its 3GPP and non-3GPP radios turned on. For the embodiment of FIGS. 3A-3D, it can be assumed that PGW 142 has been provisioned with a list of vendor identification values and an indication is associated with each value that identifies whether weighted link aggregation is or is not supported.

As part of UE 102 registration for the 3GPP core network 140, the UE communicates (302) an Initial-UE message to MME 146, which the MME communicates to PGW 142. The Initial-UE message can include an Attach-Request and a PDN-Connectivity-Request. The PDN-Connectivity-Request can include various information, such as, for example, a Request Type IE that identifies that the request is an Initial Request type, a Protocol Configuration Option IE that identifies a NBIFOM Request Indicator set to hex 0x0013, and an enhanced NBIFOM container IE that includes a Vendor Extension Identifier associated with the UE that includes a vendor identification value associated with the UE.

In at least one embodiment, the Vendor Extension Identifier can be carried in a contents octet for a parameter included in the enhanced NBIFOM container. In various embodiments, Vendor Extension Identifiers can be provisioned for communication system 100 that utilize any number of currently unassigned values (e.g., 0x09-0xFF) such that no Vendor Extension Identifier is also used to indicate an NBIFOM Extended Routing Rule content type. For the embodiment, of FIGS. 3A-3D, consider, for example, that the value 0x09 is used to indicate an NBIFOM Extended Routing Rule content type and that any of values 0x0A-0xFF can be assigned to Vendor Extension Identifiers.

For the embodiment of FIGS. 3A-3D, consider that UE 102 configured with a Vendor Extension Identifier of 0x0A that it is to include in the Initial-UE message sent to PGW 142 at 302. Further consider for the embodiment of FIGS. 3A-3D that Vendor Extension Identifier 0x0A is associated with an indication that weighted link aggregation is supported.

At 304, PGW 142, via link aggregation logic 154, analyzes the enhanced NBIFOM container IE to determine whether UE 102 supports weighted link aggregation using multiple accesses including both 3GPP access network 120 and non-3GPP access network 110 based on the Vendor Extension (Ext.) Identifier included in the enhanced NBIFOM container IE. Under the consideration that Vendor Extension Identifier 0x0A is associated with an indication that weighted link aggregation is supported for the UE, PGW 142, via link aggregation logic 154 determines at 304 that UE 102 supports weighted link aggregation using multiple accesses including both 3GPP access network 120 and non-3GPP access network 110 and stores the indication that the UE supports weighted link aggregation using multiple accesses including both 3GPP access network 120 and non-3GPP access network 110.

At 306, PGW 142 communicates an Initial-Context-Setup-Request message to UE 102 to request activation of a default bearer between PGW 142 and UE 102. The message can include an Attach-Accept IE that includes an NBIFOM container IE carrying an NBIFOM status set to 0x03 to indicate that the NBIFOM request was accepted and an Activate-Default-EPS-Bearer-Context IE that indicates a bearer activation request. At 308, UE 102 analyzes the NBIFOM container to determine that the status indicates that the NBIFOM request was accepted by PGW 142. Based on the determination at 308, UE 102 communicates (310) a Non-Access Stratum (NAS) Uplink-NAS-Transport message to PGW 142 to indicate that the bearer context request is accepted using an Activate-Default-EPS-Bearer-Context IE that indicates a bearer activation acceptance by the UE.

The Activate-Default-EPS-Bearer-Context IE can include an enhanced NBIFOM container including one or more routing rules to be associated with the 3GPP default bearer. For the embodiment of FIGS. 3A-3D it is assumed that the enhanced NBIFOM container IE included in the Uplink-NAS-Transport message contains at least one routing rule that does not include a static aggregation weight value (referred to for the present example embodiment as 'RR1') and at least one routing rule that does include a static aggregation weight value (referred to for the present example embodiment as 'RR2'). In one example embodiment, the routing rules can be formatted in an enhanced NBIFOM container as shown for the embodiment of FIG. 2. At 312, PGW 142, via link aggregation logic 154, analyzes the enhanced NBIFOM container and stores RR1 and RR2 for the default 3GPP bearer. At 314, the default bearer for the 3GPP access network 120 is established.

At 316, consider for the embodiment of FIGS. 3A-3D that UE 102 is authenticated on non-3GPP access network 110 and performs an association procedure with non-3GPP RF node/WLC 112/114, which can include interactions with 3GPP AAA element 150 and a Home Subscriber Server (HSS), which is not shown for the embodiment of FIGS. 3A-3D. As prescribed by IEEE 802.11, association procedures carried out between a UE and a WLAN AP are used to establish an AP/UE mapping that enables UE invocation of system services. Association differs from authentication in that authentication generally refers to the process where an entity's identity is authenticated, typically by providing evidence that it holds a specific digital identity such as an identifier and corresponding credentials. Completion of UE association typically follows a successful authentication of the UE with a WLAN AP.

At 318, consider for the embodiment of FIGS. 3A-3D that a default bearer for the non-3GPP access network 110 is established and that an additional routing rule (referred to for the present example embodiment as 'RR3') is associated with the non-3GPP default bearer that does not include a static aggregation weight. The additional routing rule RR3 associated with the non-3GPP default bearer is stored by PGW 142. At 320, 3GPP AAA element 150 communicates a chargeable user identity set to the IMSI of UE 102 to WLC 114. The WLC 114 or other similar controller for non-3GPP accesses (e.g., Wi-Fi) can maintain context across multiple non-3GPP flows for multiple UEs. Such context can be used to determine instrumentation for non-3GPP accesses, which can be sent to PGW 142.

Figure 3A:
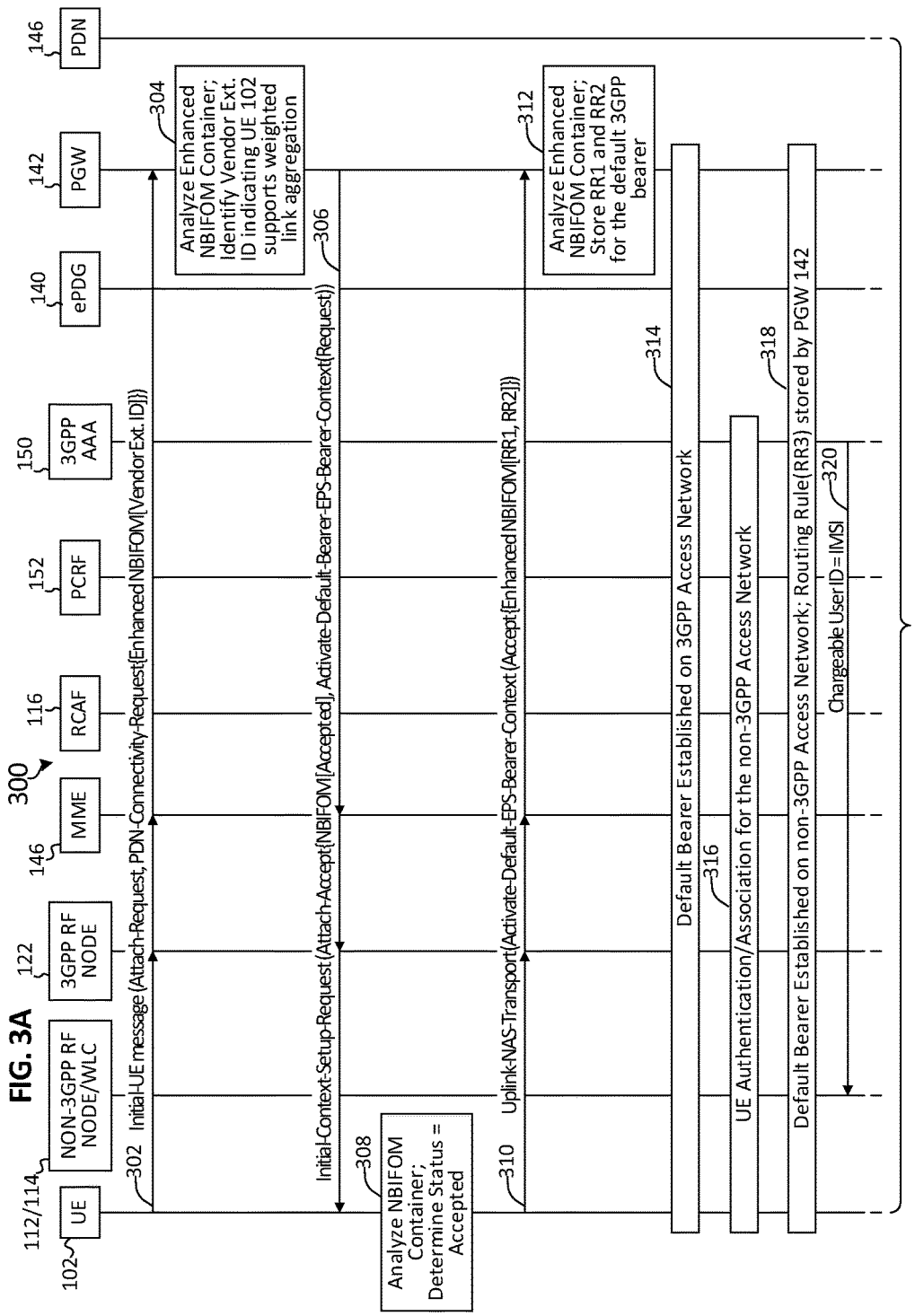
Figure 3B:
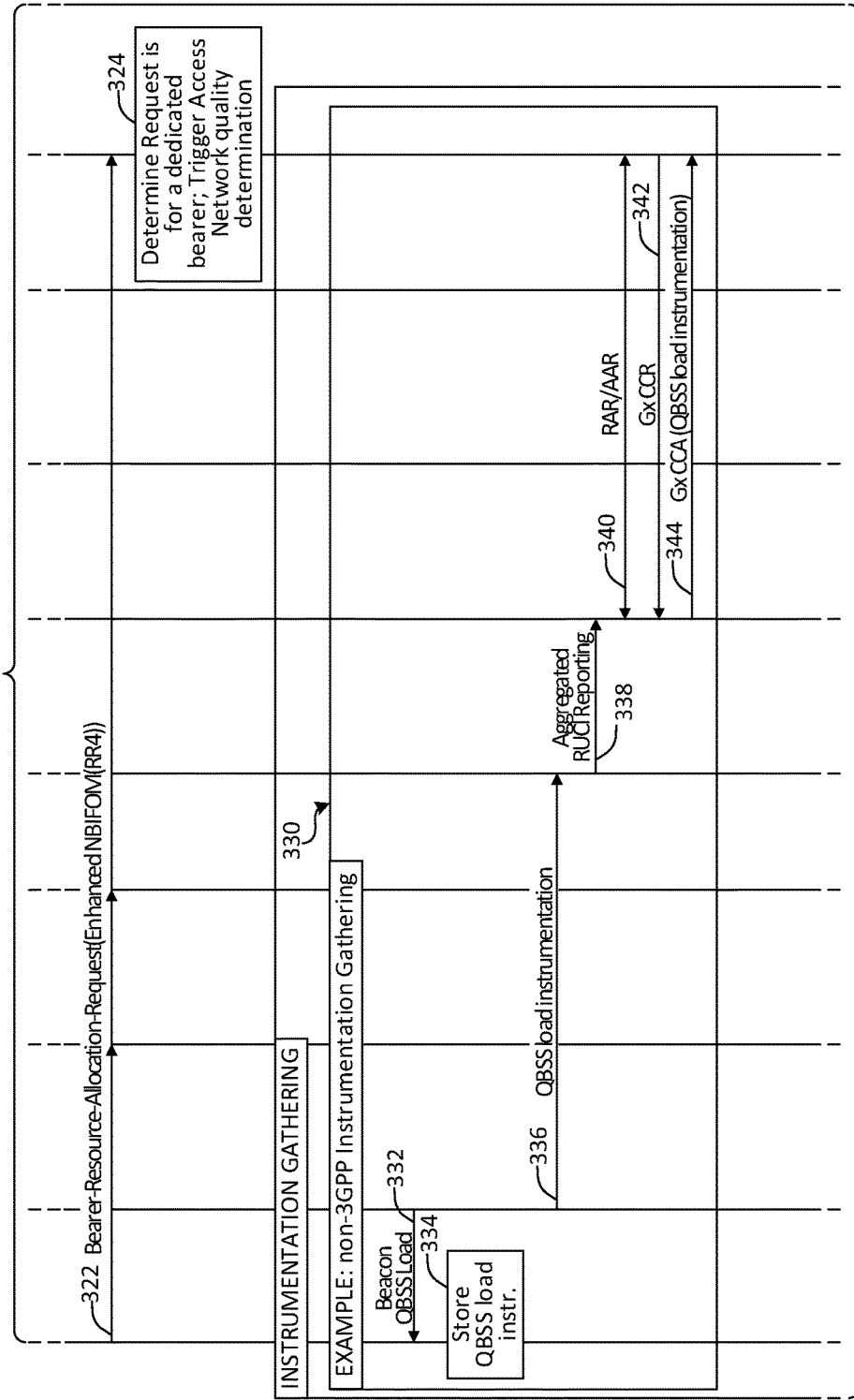
Figure 3C:
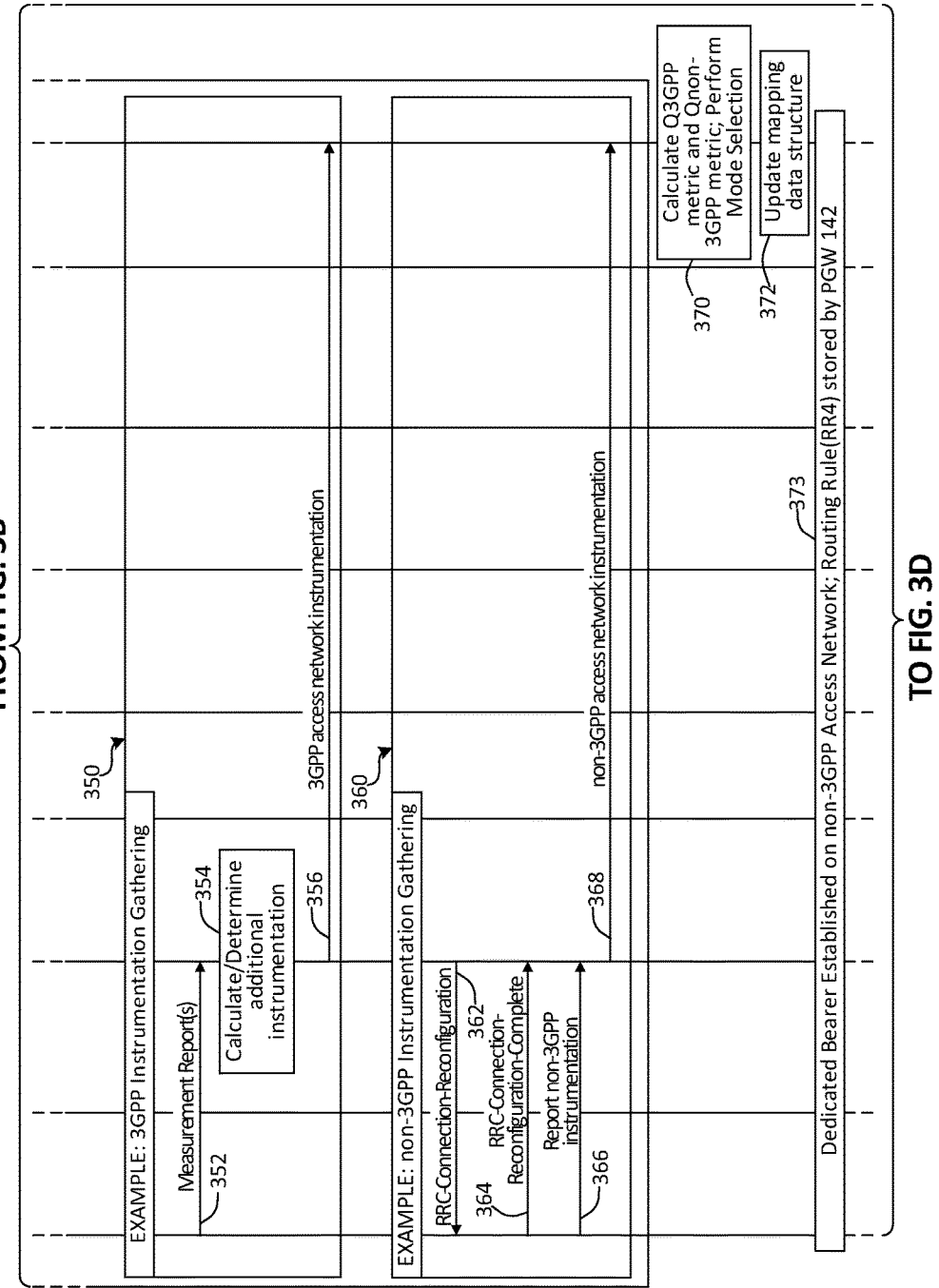

Continuing to FIG. 3B, consider further for the embodiment of FIGS. 3A-3D that a dedicated bearer for the 3GPP access network 110 is requested (322) by UE 102 sending a Bearer-Resource-Allocation-Request to PGW 142 that includes an enhanced NBIFOM container that includes an additional routing rule (referred to for the present example embodiment as 'RR4') that does not include a static aggregation weight. A routing rule associated with a dedicated bearer will not typically have a static aggregation weight associated thereto since PGW 142, via link aggregation logic 154, will first determine whether the 3GPP access network can satisfy the QoS and GBR upon detecting such a flow and then perform dynamic weight link aggregation based on a determination that the 3GPP access network cannot satisfy the QoS and GBR of such a flow. Upon receiving the request, PGW 142 determines at 324 that the request is for a dedicated bearer having a particular QoS level and GBR.

PGW 142 can first determine whether the QoS level and GBR can be satisfied by the 3GPP access network 120. Consider for the embodiment of FIGS. 3A-3D that PGW 142 determines that the QoS level and GBR cannot be satisfied by the 3GPP access network 120, which triggers PGW 142, via link aggregation logic 154 to determine access network quality for the 3GPP access network 120 and the non-3GPP access network 110 to handle traffic for the dedicated bearer. Based on the triggering, one or more sets of operations can be performed via PGW 142 to gather 3GPP instrumentation and non-3GPP instrumentation in order to perform Mode Selection Function operations to select an access network to handle traffic for the dedicated bearer.

One set of example operations (330) that may be performed to gather non-3GPP instrumentation in accordance with one example embodiment can include non-3GPP RF node 112 beaconing (332) a QoS Basic Service Set (QBSS) Load IE including QBSS load instrumentation to UE 102 using a beacon frame. In various embodiments, QBSS load instrumentation can include a station count that indicates the total number of UE associated a given QBSS, channel utilization that indicates a percentage of time that a non-3GPP RF node sensed that the wireless medium (e.g., the RF link) was busy; and/or an available admission capacity that indicates a remaining amount of medium time that is available for explicit admission control, any of which can relate to available bandwidth for non-3GPP accesses.

At 334, UE 102 stores the QBSS load instrumentation (instr.). At 336, WLC 114 signals the QBSS load instrumentation to RCAF 116. RCAF 116 performs aggregated RUCI reporting (338) to send the QBSS load instrumentation to PCRF 152 via the Np interface. Upon receiving the information a Re-Authorization-Request (RAR) and Re-Authorization-Answer (RAA) signaling exchange (340) is performed between PCRF 152 and PGW 142 to indicate to PGW 142 the availability of the instrumentation received via the aggregated RUCI reporting. At 342, PGW 142 communicates a Gx Credit-Control-Request (CCR) message to PCRF 152 to which PCRF 152 responds (344) with the QBSS load instrumentation included in a Gx Credit-Control-Answer (CCA) message and PGW 142 can store the instrumentation for further processing (e.g., to determine a Qnon-3GPP metric for the non-3GPP access network and perform access network selection using a ModeSelectionFunction).

Another set of example operation (350) that may be performed to gather 3GPP instrumentation in accordance with one example embodiment can include UE 102 providing measurement report(s) (352) to 3GPP RF node 112 that can include signal strength information, signal quality information, detected RF node information, combinations thereof or any other information that may be provided by UE measurement reporting as defined by 3GPP standards. At 354, 3GPP RF node 112 calculates and/or determines additional 3GPP access network instrumentation (e.g., channel utilization, bandwidth availability, etc.) based, at least in part, on the received measurement report(s) received from UE 102. At 356, 3GPP RF node 112 communicates the 3GPP access network instrumentation to PGW 142 and PGW 142 can store the instrumentation for further processing (e.g., to determine a Q3GPP metric for the 3GPP access network and perform access network selection using a ModeSelectionFunction).

Yet another set of example operation (360) that may be performed to gather non-3GPP instrumentation in accordance with one example embodiment can include 3GPP RF node 112 communicating (362) Radio Resource Control (RRC) messaging to UE 102 including an RRC-Connection-Reconfiguration requesting UE 102 to report instrumentation (e.g., measurements and information such as, for example, signal strength, quality, SSID information, BSSID information, BSS load, etc.) for the non-3GPP access network 110. At 364, UE 102 responds with an RRC-Connection-Reconfiguration-Complete message indicating that it has modified its RRC connection configuration and the UE reports (366) the instrumentation to 3GPP RF node 112. At 368, 3GPP RF node 112 sends the non-3GPP access network instrumentation to PGW 142 and PGW 142 can store the instrumentation for further processing (e.g., to determine a Qnon-3GPP metric for the non-3GPP access network and perform access network selection using a ModeSelection-Function).

Example operations 330, 350, and 360 illustrating different operations and interactions for gathering instrumentation are only a few of the many operations and interactions that can be used to gather 3GPP access network instrumentation and non-3GPP access network instrumentation in accordance with the teachings of the present disclosure. Virtually any other operations or interactions can be used to gather 3GPP access network instrumentation and non-3GPP access network within communication system 100 and, thus, are clearly within the scope of the teachings of the present disclosure.

Returning to FIG. 3C at 370, PGW 142, via link aggregation logic 154, can calculate a Q3GPP metric using instrumentation gathered for the 3GPP access network 120, can calculate a Qnon-3GPP metric using instrumentation gathered for the non-3GPP access network 110, and can perform mode selection for the dedicated bearer using a Mode Selection Function (e.g., using a modified form of example ModeSelectionFunction as shown in TABLE 1 to evaluate the Q3GPP and Qnon-3GPP metrics). Consider for the embodiment of FIGS. 3A-3D that PGW 142, via link aggregation logic 154, selects the non-3GPP access network 110 to handle traffic for the dedicated bearer, which can cause PGW to update (372) its UE-IP Flow/Access Mapping data structure flow tuple information associated with the dedicated bearer. At 373, the dedicated bearer for the non-3GPP access network 110 is established, which is associated with RR4.

Turning to FIG. 3D at 374, consider that a non-GBR downlink (DL) data packet is received by PGW 142 from a particular PDN 160 and is to be delivered to UE 102. PGW 142, via link aggregation logic 154, can perform various operations (390) including determining (391) whether the UE supports weighted link aggregation using NBIFOM and whether flow tuple information associated with the IP flow is identified in its UE-IP Flow/Access Mapping data structure. In one embodiment, a PGW can check to see whether an indication has been stored for a UE (e.g., as can be stored at 304) to determine whether the UE supports weighted link aggregation using NBIFOM. Based on a determination that no flow tuple information associated with the IP flow is stored in the data structure, PGW 142, via link aggregation logic can perform various operations (392) including identifying a routing rule associated with the packet (e.g., matching the flow tuple information to any of the routing rules (e.g., RR1-RR4)) stored by PGW 142 to perform weighted link aggregation, and selecting a corresponding access network to handle the IP flow using either static or dynamic weight link aggregation based on the identified rule (e.g., based on whether a static aggregation is or is not associated with the identified rule) and assigning and routing the packet using an associated bearer for the selected access network. If an access network is selected using dynamic weight link aggregation that involves performing Mode Selection Function operations, PGW 142, via link aggregation logic 154, can update its UE-IP Flow/Access Mapping data structure with flow tuple information and the selected access network for the IP flow.

Based on a determination that flow tuple information associate with the IP flow is stored in the data structure, PGW 142, via link aggregation logic can perform operations (393) including routing the packet using the associated bearer for the access network identified in the data structure.

Consider at 376 that a GBR DL data packet is received by PGW 142. Again, PGW 142, via link aggregation logic 154, can perform operations 390 to determine an associated bearer (e.g., potentially the dedicated bearer for the non-3GPP access network, depending on flow tuple information associated with RR4 and whether the QoS level and GBR can be satisfied by the 3GPP access network).

Depending on which access network and bearer is selected to handle traffic for a given flow, PGW 142 can route DL packets to UE 102 using the 3GPP access network 120, as shown at 378, or can route DL packets to UE 102 using the non-3GPP access network 110, as shown at 380.

Operations 390 can also be performed for uplink (UL) data packets communicated (382) to PGW 142, which can forward (384) the packets to PDN 160 based on operations 390. Thus, as shown for the embodiment of FIGS. 3A-3D, communication system 100 can facilitate link aggregation over both 3GPP access networks and non-3GPP access networks for UE supporting such link aggregation.

Referring to FIG. 4, FIG. 4 is a simplified flow diagram illustrating example operations 400 that can be associated with providing link aggregation across multiple accesses using NBIFOM in accordance with one potential embodiment. In at least one embodiment, operations 400 can be performed by a PGW provisioned with link aggregation logic (e.g., PGW 142 provisioned with link aggregation logic 154).

The operations can begin with the PGW 142 receiving (402) a packet associated with a particular IP flow for a UE that supports weighted link aggregation (e.g., UE 102) across multiple accesses using NBIFOM. In one embodiment, a PGW can check to see whether an indication has been stored for a UE to determine whether the UE supports weighted link aggregation across multiple access networks using NBIFOM. The packet can be an uplink (UL) or downlink (DL) packet. At 404, the PGW, via the link aggregation logic, can perform a look up on a mapping data structure (e.g., a UE-IP Flow/Access Mapping data structure) using flow tuple information included with the packet. At 406, the PGW, via the link aggregation logic, can determine whether the flow tuple information is identified in the data structure. Based on a determination at 406 that the flow tuple information is identified in the data structure, the operations can continue to 416, discussed in further detail below. However, based on a determination at 406 that the flow tuple information is not identified in the data structure, the operations can continue 408.

At 408, the operations can include the PGW, via the link aggregation logic, identifying an NBIFOM routing rule that includes routing filter information (e.g., as carried in an enhanced NBIFOM container IE) using the flow tuple information included with the packet. At 410, the operations can include the PGW, via the link aggregation logic, performing link aggregation using either dynamic weight link aggregation operations or static weight link aggregation operations, as discussed for various embodiments described herein, based on the identified routing rule to select an access network to handle the IP flow.

At 412, the operations can include the PGW, via the link aggregation logic, assigning the IP flow to a bearer based on the access network selection and the operations can continue to 416. In at least one embodiment, based on the link aggregation being performed at 310 using dynamic weight link aggregation, the operations can include the PGW, via the link aggregation logic, updating (414) the mapping data structure to include the flow tuple information associated with the IP flow and an indication of the access network selected.

At 416, the operations can include the PGW, via the link aggregation logic, determining whether the packet is an UL or DL data packet. Based on a determination at 416 that the packet is a DL data packet, the operations can continue to 418 at which the PGW can route the DL packet to the UE using the assigned bearer and the operations can return to 402 to receive another packet for the UE for the operations to be repeated. Based on a determination at 416 that the packet is an UL data packet, the operations can continue to 420 at which the PGW can route the UL packet to an associated PDN based on the flow tuple information included in the packet and the operations can return to 402 to receive another packet for the UE for the operations to be repeated.

Figure 5:
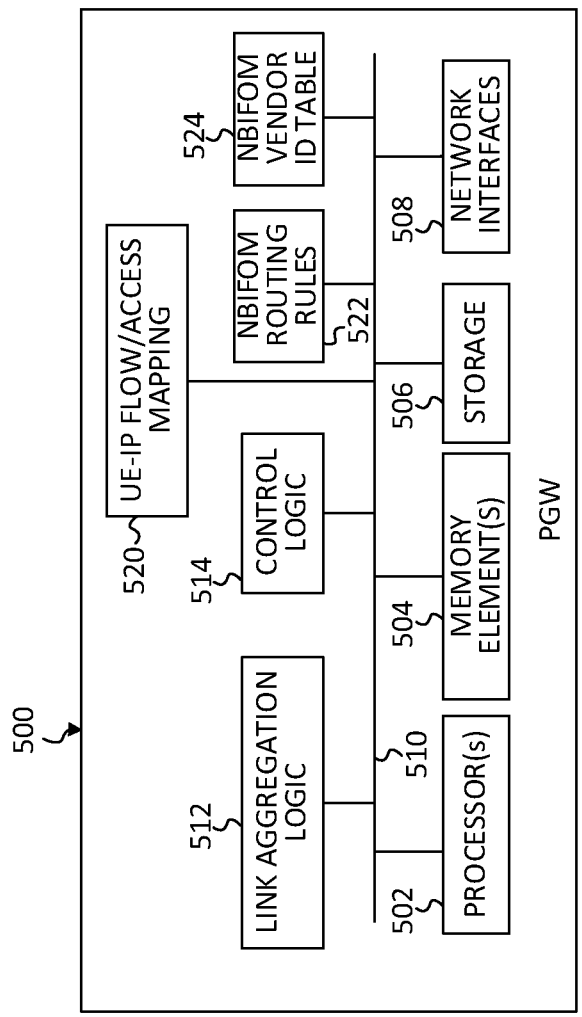
FIG. 5 is a simplified block diagram illustrating example details that can be associated with one potential embodiment of the communication system.

Referring to FIG. 5, FIG. 5 is a simplified block diagram illustrating example details that can be associated with an example PGW 500 in accordance with one potential embodiment. Example PGW 500 can be representative of any PGW (e.g., PGW 142, including link aggregation logic 154) that may be deployed in communication system 100. In at least one embodiment, PGW 500 can include one or more processor(s) 502, one or more memory element(s) 504, storage 506, network interfaces 508, a bus 510, link aggregation logic 512, and control logic 514. Various data structures can also be provisioned and/or managed (e.g., to add, remove, and/or update entries) by PGW 500 including, but not limited to, a UE-IP Flow/Access Mapping data structure 520, an NBIFOM routing rules data structure 522, and an NBIFOM vendor ID table 524. In various embodiments, instructions associated with any logic, engines, etc. provisioned for PGW 500 can overlap in any manner and are not limited to the specific allocation of instructions and/or operations described herein.

In at least one embodiment, processor(s) 502 is/are at least one hardware processor configured to execute various tasks, operations and/or functions for PGW 500 as described herein according to software and/or instructions configured for PGW 500. In at least one embodiment, memory element(s) 504 and/or storage 506 is/are configured to store data, information, software, and/or instructions associated with PGW 500, and/or logic configured for memory element(s) 504 and/or storage 506 (e.g., any logic, engines, etc. can, in various embodiments, be stored using any combination of memory element(s) 504 and/or storage 506). Note that in some embodiments, storage can be consolidated with memory elements (or vice versa), or can overlap/exist in any other suitable manner.

In at least one embodiment, bus 510 can be configured as an interface that enables one or more elements of PGW 500 to communicate in order to exchange information and/or data. In at least one embodiment, bus 510 may be implemented as a fast kernel-hosted interconnect, potentially using shared memory between processes (e.g., logic, etc.), which can enable efficient communication paths between the processes.

In various embodiments, network interfaces 508 enable communication between PGW 500, and other network elements, systems, etc. that may be present in communication system 100 to facilitate operations discussed for various embodiments described herein. In some embodiments, network interfaces 508 can include one or more Ethernet driver(s) and/or controller(s), Fibre Channel driver(s) and/or controller(s), or other similar network interface driver(s) and/or controller(s) to enable communications for PGW 500 within communication system 100.

As noted, various data structures can also be provisioned and/or managed (e.g., to add, remove, and/or update entries) by PGW 500 including, but not limited to, UE-IP Flow/Access Mapping data structure 520, NBIFOM routing rules data structure 522, and NBIFOM vendor ID table 524. In at least one embodiment, UE-IP Flow/Access Mapping data structure 520 can be managed by PGW 500, via link aggregation logic 512, to include flow tuple information for one or more UE IP flows and, for each IP flow, an access network type that has been selected to handle the IP flow can be identified. In at least one embodiment, NBIFOM routing rules data structure 522 can be managed by PGW 500, via link aggregation logic 512, to include one or more NBIFOM routing rule(s) for each of one or more UE(s) having sessions established with the PGW. In at least one embodiment, NBIFOM vendor ID table 524 can be provisioned with one or more vendor identification values such that each value can include an indication that identifies whether a UE associated with a particular vendor supports weighted link aggregation. In at least one embodiment, NBIFOM vendor ID table 524 can be provisioned for PGW 500 by a network operator and/or service provider.

In various embodiments, forwarding logic link aggregation logic can include instructions that, when executed (e.g., by one or more processor(s) 502), cause PGW 500 to perform link aggregation operations as discussed for various embodiments described herein. In various embodiments, control logic 514 can include instructions that, when executed (e.g., by one or more processor(s) 502), cause PGW 500 to perform operations, which can include, but not be limited to: providing overall control operations of PGW 500; cooperating with link aggregation logic 512 to perform various operations; cooperating, maintaining, and/or otherwise interacting with logic, data structures, stored data, information, parameters, etc. (e.g., memory element(s), storage, data structures, databases, tables, etc.) of PGW 500 to perform various operations; combinations thereof; and/or the like to facilitate various operations as discussed for various embodiments described herein.

Variations and Implementations

In regards to the internal structure associated with communication system 100, appropriate software, hardware, and/or algorithms are being provisioned for UE 102, 3GPP RF node 122, non-3GPP RF node 112, WLC 114, RCAF 116 (if implemented), MME 146, SGW 144, PGW 142 (or any other PGW embodied as PGW 500), ePDG 148, 3GPP AAA element 150, and PCRF 152 within communication system 100 in order to facilitate NBIFOM link aggregation operations in a network environment in accordance with the teachings of the present disclosure. For example, UE 102, 3GPP RF node 122, non-3GPP RF node 112, WLC 114, RCAF 116 (if implemented), MME 146, SGW 144, ePDG 148, 3GPP AAA element 150, and PCRF 152 can also be configured with one or more processor(s), memory element(s), storage, network interfaces, logic, data structures, radios (e.g., RF transmitter(s), receiver(s), and antenna(s)), combinations thereof, or the like to facilitate NBIFOM link aggregation operations in a network environment in accordance with the teachings of the present disclosure.

Communications in a network environment are referred to herein as 'frames', 'messages', 'messaging' and/or 'signaling', which may be inclusive of packets. Generally, signaling is referred to in reference to control-plane or management-plane communications while messaging can be referred to in reference to control-plane, management-plane, and/or data-plane communications at an application level.

As discussed herein in this Specification, a packet or frame is a formatted unit of data that can contain both control information (e.g., source and destination address, etc.) and data, which is also known as payload. In some embodiments, control information can be included in headers and trailers for packets or frames. Packets or frames can be sent and received according to any suitable communication protocols. Suitable communication protocols can include a multi-layered scheme such as the Open Systems Interconnection (OSI) Model, or any derivations or variants thereof. The terms 'data', 'information', and 'parameters' as used herein can refer to any type of binary, numeric, voice, video, textual or script data or information, or any type of source or object code, or any other suitable data or information in any appropriate format that can be communicated from one point to another in electronic devices and/or networks. Additionally, signaling, frames, messages, requests, responses, replies, queries, etc. are forms of network traffic and, therefore, may comprise one or more packets or frames.

In various embodiments, communication system 100 may implement user datagram protocol/Internet Protocol (UDP/IP) connections and/or transmission control protocol/IP (TCP/IP) communication language protocol in particular embodiments of the present disclosure. However, communication system 100 can alternatively implement any other suitable communication protocol, interface and/or standard, proprietary and/or non-proprietary, for transmitting and receiving messaging and/or signaling. Other protocols, interfaces and/or communication standards that can be used in communication system 100 can include a Terminal Access controller access-control system (TACACS), TACACS+, Proxy Mobile IP version 6 (PMIPv6), Proxy Mobile IP version 4 (PMIPv4), Extensible Messaging and Presence Protocol (XMPP), General Packet Radio Service (GPRS) Tunneling Protocol (GTP) (version 1 or version 2), Generic Route Encapsulation (GRE), Ethernet over GRE (EoGRE), Extensible Messaging and Presence Protocol (XMPP), Simple Object Access Protocol (SOAP), SOAP over Hypertext Transfer Protocol (HTTP), Representational State Transfer (REST), combinations thereof, or the like. In some embodiments, secure communications can be facilitated using TCP/IP Secure Sockets Layer (SSL) communications.

In various embodiments, a UE (e.g., UE 102 and/or any other UE that may be present in communication system 100) can be inclusive of devices used to initiate and/or respond to communications in a network, such as a computer, an electronic device such as an Internet of Things (IoT) device (e.g., an appliance, a thermostat, a sensor, a home automation controller, a voice activated device, a parking meter, etc.), a personal digital assistant (PDA), a laptop or electronic notebook, a gaming system, a vehicle infotainment system, a home entertainment electronic device (e.g., a smart television, digital recording device, speaker, etc.), a cellular telephone, an IP phone, an electronic device having cellular and/or Wi-Fi connection capabilities, a wearable electronic device or any other device, component, element, or object capable of initiating voice, audio, video, media, or data exchanges for simultaneous active accesses within communication system 100. A UE may also be inclusive of a suitable interface to a human user such as a microphone, a display, a keyboard, or other terminal equipment.

A UE may also be any device that seeks to initiate a communication on behalf of another entity or element such as a program, application, a database, or any other component, device, element, or object capable of initiating an exchange for simultaneous active accesses within communication system 100. In at least some embodiments, a UE can be associated with users that communicate in communication system 100. In other embodiments, UE may facilitate data exchanges while operating independently of user interactions. Within communication system 100, IP addresses, if used, can be assigned using Dynamic Host Configuration Protocol (DHCP), Stateless Address Autoconfiguration (SLAAC), or any suitable variation thereof. IP addresses, if used within communication system 100, can include IPv4 and/or IPv6 addresses.

In various embodiments, a subscriber associated with a given UE and/or the UE itself can be identified using one or more identifiers such as, for example, an International Mobile Subscriber Identity (IMSI), a Temporary IMSI (T-IMSI), a Serving Temporary Mobile Subscriber Identity (S-TMSI), a Globally Unique Temporary UE Identity (GUTI) or a Mobile Station International Subscriber Directory Number (MSISDN).

In various embodiments, MME 146 can provide tracking area list management, idle mode UE tracking, bearer activation and deactivation, serving gateway and packet data network gateway selection for UEs and authentication services. In at least one embodiment, MME 146 may be in communication with a Home Subscriber Server (HSS) (not shown), which may include one or more databases containing user-related and subscription-related information. An HSS may perform functionalities such as mobility management, call and session establishment support, user authentication and access authorization. In various embodiments, SGW 144 may route and forward user data packets (e.g., flows) and may also act as the mobility anchor for the user plane during inter-eNodeB handovers and as the anchor for mobility between LTE and other 3GPP technologies. In various embodiments, a PGW (e.g., PGW 142 or any other PGW embodied as PGW 500) may provide IP connectivity access network (IP-CAN) session connectivity from a given UE (e.g., UE 102) to external packet data network(s) 160 by being the point of exit and entry of IP flows for the UE.

In various embodiments, ePDG 148 can enable security associations to be provided to UE over an untrusted non-3GPP access network, such as non-3GPP access network 110. In various embodiments, security associations can be provided for UE using Internet Key Exchange version 2 (IKEv2) protocol exchanges for Internet Protocol Security (IPsec) security associations. IPsec can use cryptographic security services to protect communications over IP networks. IPsec can support network-level peer authentication, data origin authentication, data integrity, data confidentiality (encryption), and replay protection. Implementation of IPsec can be based on Internet Engineering Task Force (IETF) standards, in various embodiments. In various embodiments, security for the interface (e.g., the SWu interface, as defined by 3GPP standards) between ePDG 148 and one or more UE (e.g., UE 102) can be achieved using IPSec, Secure Sockets Layer (SSL), or any other secure tunnel.

3GPP AAA element 150 is a network element responsible for accounting, authorization and authentication functions for UE in the network (e.g., UE 102). For AAA considerations, AAA element 150 may provide UE IP address and the accounting session identification (Acct-Session-ID) information and/or other UE states in appropriate messaging (e.g., via Access-Request/Access-Response messages) as defined by 3GPP standards. Authentication generally refers to the process where an entity's identity is authenticated, typically by providing evidence that it holds a specific digital identity such as an identifier and the corresponding credentials. Authorization generally refers to the process in which it is determined whether a particular entity is authorized to perform a given activity, typically inherited from authentication when logging on to an application or service. Authorization can be determined based on a range of restrictions, for example time-of-day restrictions, or physical location restrictions, or restrictions against multiple accesses by the same entity or user. Accounting generally refers to the tracking of network resource consumption by UEs for the purpose of capacity and trend analysis, cost allocation, billing, etc. In some embodiments, accounting can be used to record events such as authentication and authorization failures. In various embodiments, communication system 100 may be provisioned with other AAA elements, services, and/or servers, which may provide AAA considerations for the system.

In various embodiments, PCRF 152 can determine policy and charging control (PCC) activities to apply to UE IP flows based on various PCC rules. PCRF 152 can be configured to use user subscription information as a basis for the policy and/or charging control decisions. The subscription information may apply for both session-based and non-session based services. For example, PCRF 152 may determine PCC rules based on an application or service described to the PCRF from an application function (AF) or the like. Application functions or the like can describe applications and/or services to PCRF 152 that may require dynamic policy and/or charging control for one or more UE. In various embodiments, dynamic policy and/or charging controls may include, but not be limited to: controlling the detection of different types of IP flows; setting charging instructions, QoS levels, GBR levels, MBR levels, etc. for IP flows, and/or providing gating for IP flows. PCRF 152 may communicate PCC rules to a PGW (e.g., PGW 142 or any other PGW embodied as PGW 150) upon request and/or upon triggering of certain events and/or conditions. A PGW may serve as policy enforcement points to manage QoS, online/offline flow-based charging, data generation, deep-packet inspection and intercept for one or more UE IP flows.

In various embodiments, 3GPP core network 140 can include various additional elements and/or nodes as may be defined by 3GPP standards including, but not limited to: Mobile Switching Centers (MSCs), Serving GPRS Support Nodes (SGSNs), Gateway GPRS Support Nodes (GGSNs), or other elements and/or nodes to facilitate the exchange of data to and from one or more PDNs for one or more UEs. These network elements are also not shown in order to illustrate other features of communication system 100. In various embodiments, one or more PDN(s) 160 can include the Internet, an IP Multimedia Subsystem (IMS), an enterprise network, operator IP services, combinations thereof or the like.

Communication system 100 can include one or more networks, such as non-3GPP access network 110, 3GPP access network 120, 3GPP core network 140, and/or one or more packet data network(s) 160, which can represent a series of points or network elements of interconnected communication paths for receiving and transmitting messages (e.g., packets of information) that propagate through the one or more networks. These network elements offer communicative interfaces and faces that facilitate communications between the network elements. A network can comprise any number of hardware and/or software elements coupled to (and in communication with) each other through a communication medium. Such networks can include, but are not limited to, any local area network (LAN), virtual local area network (VLAN), wide area network (WAN) such as the Internet, wireless local area network (WLAN), metropolitan area network (MAN), Intranet, Extranet, virtual private network (VPN), Low Power Network (LPN), Low Power Wide Area Network (LPWAN), Machine to Machine (M2M) network, IoT network, any other appropriate architecture or system that facilitates communications in a network environment, combinations thereof, or any suitable combination thereof.

Networks through which communications propagate in communication system 100 can use any suitable technologies for communication including wireless (e.g., 3G/4G/5G/nG, IEEE 802.11, WiMAX, IEEE 802.16, Radio-frequency Identification (RFID), Near Field Communication (NFC), Bluetooth™, etc.), and/or wired (e.g., T1 lines, T3 lines, digital subscriber lines (DSL), Ethernet, Fibre Channel, etc.) communication. Generally, any suitable means of communication may be used such as electric, sound, light, infrared, and/or radio.

In various example implementations, 3GPP RF nodes 122, non-3GPP RF nodes 112, WLC 114, RCAF 116 (if implemented), MME 146, SGW 144, PGW 142 (or any other PGW embodied as PGW 500), ePDG 148, 3GPP AAA element 150, and/or PCRF 152 discussed for various embodiments described herein can encompass network elements such as, for example, network appliances, forwarders, routers, servers, switches, gateways, bridges, loadbalancers, firewalls, processors, modules, radio receivers/transmitters or any other suitable device, component, element, or object operable to exchange information that facilitates or otherwise helps to facilitate various NBIFOM link aggregation operations in a network environment (e.g., for networks such as those illustrated in FIG. 1) as described for various embodiments discussed herein. In various embodiments, one or more of the 3GPP RF nodes 122, non-3GPP RF nodes 112, WLC 114, RCAF 116 (if implemented), MME 146, SGW 144, PGW 142 (or any other PGW embodied as PGW 500), ePDG 148, 3GPP AAA element 150, and/or PCRF 152 discussed herein can include software (or reciprocating software) that can coordinate in order to achieve operations associated with providing NBIFOM link aggregation in a network environment as discussed herein and may include any suitable algorithms, hardware, software, components, modules, logic, clients, interfaces, and/or objects that facilitate the operations thereof. This may be inclusive of appropriate algorithms, communication protocols, interfaces, and/or standards, proprietary and/or non-proprietary, that allow for the effective exchange of data or information.

In various embodiments, 3GPP RF nodes 122, non-3GPP RF nodes 112, WLC 114, RCAF 116 (if implemented), MME 146, SGW 144, PGW 142 (or any other PGW embodied as PGW 500), ePDG 148, 3GPP AAA element 150, and/or PCRF 152 as discussed herein may keep information in any suitable memory element [e.g., random access memory (RAM), read only memory (ROM), an erasable programmable read only memory (EPROM), application specific integrated circuit (ASIC), etc.], software, hardware, or in any other suitable component, device, element, and/or object where appropriate and based on particular needs. Any of the memory items discussed herein should be construed as being encompassed within the broad term 'memory element'. Information being tracked or sent to one or more of 3GPP RF nodes 122, non-3GPP RF nodes 112, WLC 114, RCAF 116 (if implemented), MME 146, SGW 144, PGW 142 (or any other PGW embodied as PGW 500), ePDG 148, 3GPP AAA element 150, and/or PCRF 152 discussed herein could be provided in any database, table, register, control list, cache, storage and/or storage structure: all of which can be referenced at any suitable timeframe. Any such storage options may also be included within the broad term 'memory element' as used herein. Any of potential processing elements, controllers, systems, managers, logic, and/or machines described herein can be construed as being encompassed within the broad term 'processor'. In various embodiments, 3GPP RF nodes 122, non-3GPP RF nodes 112, WLC 114, RCAF 116 (if implemented), MME 146, SGW 144, PGW 142 (or any other PGW embodied as PGW 500), ePDG 148, 3GPP AAA element 150, and/or PCRF 152 discussed herein can also include suitable interfaces and faces for receiving, transmitting, and/or otherwise communicating data or information in a network environment.

Note that in certain example implementations, operations as outlined herein to facilitate NBIFOM link aggregation in a network environment may be implemented by logic encoded in one or more tangible media, which may be inclusive of non-transitory tangible media and/or non-transitory computer readable storage media (e.g., embedded logic provided in an ASIC, in digital signal processing (DSP) instructions, software [potentially inclusive of object code and source code] to be executed by a processor, or other similar machine, etc.). In some of these instances, a memory element and/or storage can store data, software, code, instructions (e.g., processor instructions), logic, parameters, combinations thereof or the like used for operations described herein. This includes memory elements and/or storage being able to store data, software, code, instructions (e.g., processor instructions), logic, parameters, combinations thereof, or the like that are executed to carry out operations in accordance with teachings of the present disclosure.

A processor (e.g., a hardware processor) can execute any type of instructions associated with data to achieve the operations detailed herein. In one example, a processor can transform an element or an article (e.g., data, information) from one state or thing to another state or thing. In another example, operations outlined herein may be implemented with logic, which can include fixed logic, hardware logic, programmable logic, digital logic, etc. (e.g., software/computer instructions executed by a processor) and/or one or more the elements described herein could be some type of a programmable processor, programmable digital logic (e.g., a field programmable gate array (FPGA), a DSP processor, an EPROM, a controller, an electrically erasable PROM (EEPROM), or an ASIC) that includes digital logic, software, code, electronic instructions, or any suitable combination thereof.

One or more advantages mentioned herein do not in any way suggest that any one of the embodiments described herein necessarily provides all the described advantages or that all the embodiments of the present disclosure necessarily provide any one of the described advantages. Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein this Specification, can be inclusive of an executable file comprising instructions that can be understood and processed on a server, computer, processor, machine, compute node, combinations thereof or the like and may further include library modules loaded during execution, object files, system files, hardware logic, software logic, or any other executable modules.

It is also important to note that the operations and steps described with reference to the preceding FIGURES illustrate only some of the possible scenarios that may be executed by, or within, the communication system 100. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

As used herein, unless expressly stated to the contrary, use of the phrase 'at least one of', 'one or more of' and 'and/or' are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. As referred to herein, 'at least one of', 'one or more of', and the like can be represented using the '(s)' nomenclature (e.g., one or more element(s)).

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, interfaces and protocols, communication system 100 may be applicable to other exchanges or routing protocols, interfaces and/or communications standards, proprietary and/or non-proprietary. Moreover, although communication system 100 has been illustrated with reference to particular elements and operations that facilitate the communication process, these elements, and operations may be replaced by any suitable architecture or process that achieves the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A computer-implemented method comprising:
    receiving, at a packet data network gateway (PGW), a packet associated with an Internet Protocol (IP) flow of a user equipment (UE);
    identifying a routing rule associated with the IP flow, wherein the routing rule comprises routing access information that identifies whether the IP flow can be routed across a plurality of access networks using weighted link aggregation;
    performing a comparison by operation of one or more computer processors, wherein the comparison is selected from: (i) a first comparison of a hash of a flow tuple for the packet against a first threshold value associated with the routing rule; and (ii) a second comparison of each of first and second determined metrics against a second threshold value, wherein the first and second determined metrics are associated with communication quality of first and second access networks to facilitate communications for the IP flow of the UE, respectively; and
    identifying, based on the performed comparison, a particular access network to select to facilitate communications for the IP flow of the UE based on the routing rule, wherein the particular access network is selected.

2. The method of claim 1, wherein the performed comparison comprises the first comparison.

3. The computer-implemented method of claim 2, wherein the first threshold value is a static weight value that received by the PGW from the UE.

4. The computer-implemented method of claim 1, wherein the performed comparison comprises the second comparison, wherein the computer-implemented method further comprises determining each of the first and second metrics.

5. The computer-implemented method of claim 4, further comprising:
    storing, by the PGW, flow tuple information included with the packet in association with the selected particular access network in a data structure maintained by the PGW.

6. The computer-implemented method of claim 1, further comprising:
    receiving, by the PGW, an indication from the UE that the UE supports receiving packets using the plurality of access networks using weighted link aggregation; and
    storing the indication received from the UE.

7. The computer-implemented method of claim 1, wherein the plurality of access networks comprise one or more of:
    one or more 3rd Generation Partnership Project (3GPP) access network types; and
    one or more non-3GPP access network types.

8. The computer-implemented method of claim 1, further comprising:
    assigning the IP flow of the UE to a bearer established for the UE for the particular access network.

9. One or more non-transitory tangible media encoding logic that includes instructions executable to perform an operation comprising:
    receiving, at a packet data network gateway (PGW), a packet associated with an Internet Protocol (IP) flow of a user equipment (UE);
    identifying a routing rule associated with the IP flow, wherein the routing rule comprises routing access information that identifies whether the IP flow can be routed across a plurality of access networks using weighted link aggregation;
    performing a comparison by operation of one or more computer processors when executing the instructions, wherein the comparison is selected from: (i) a first comparison of a hash of a flow tuple for the packet against a first threshold value associated with the routing rule; and (ii) a second comparison of each of first and second determined metrics against a second threshold value, wherein the first and second determined metrics are associated with communication quality of first and second access networks to facilitate communications for the IP flow of the UE, respectively; and
    identifying, based on the performed comparison, a particular access network to select to facilitate communications for the IP flow of the UE based on the routing rule, wherein the particular access network is selected.

10. The one or more non-transitory tangible media of claim 9, wherein the performed comparison comprises the first comparison.

11. The one or more non-transitory tangible media of claim 10, wherein the first threshold value is a static value that received by the PGW from the UE.

12. The one or more non-transitory tangible media of claim 9, wherein the performed comparison comprises the second comparison, wherein the operation further comprises determining each of the first and second metrics.

13. The one or more non-transitory tangible media of claim 12, wherein the operation further comprises:

storing, by the PGW, flow tuple information included with the packet in association with the selected particular access network in a data structure maintained by the PGW.

14. The one or more non-transitory tangible media of claim 9, wherein the operation further comprises:
receiving, by the PGW, an indication from the UE that the UE supports receiving packets using the plurality of access networks using weighted link aggregation; and
storing the indication received from the UE.

15. The one or more non-transitory tangible media of claim 9, wherein the operation further comprises:
assigning the IP flow of the UE to a bearer established for the UE for the particular access network.

16. A packet data network gateway (PGW) comprising:
at least one memory element for storing data; and
at least one computer processor to execute instructions associated with the data, wherein executing the instructions causes the PGW to perform an operation comprising:
receiving, at a packet data network gateway (PGW), a packet associated with an Internet Protocol (IP) flow of a user equipment (UE);
identifying a routing rule associated with the IP flow, wherein the routing rule comprises routing access information that identifies whether the IP flow can be routed across a plurality of access networks using weighted link aggregation;
performing a comparison selected from: (i) a first comparison of a hash of a flow tuple for the packet against a first threshold value associated with the routing rule; and (ii) a second comparison of each of first and second determined metrics against a second threshold value, wherein the first and second determined metrics are associated with communication quality of first and second access networks to facilitate communications for the IP flow of the UE, respectively; and
identifying, based on the performed comparison, a particular access network to select to facilitate communications for the IP flow of the UE based on the routing rule, wherein the particular access network is selected.

17. The PGW of claim 16, wherein the performed comparison comprises the first comparison.

18. The PGW of claim 17, wherein the first threshold value is a static value that received by the PGW from the UE.

19. The PGW of claim 16, wherein the performed comparison comprises the second comparison, wherein the operation further comprises determining each of the first and second metrics.

20. The PGW of claim 16, wherein the operation further comprises:
storing, by the PGW, flow tuple information included with the packet in association with a selected particular access network in a data structure maintained by the PGW.

* * * * *